(12) United States Patent
Morag et al.

(10) Patent No.: US 11,791,108 B2
(45) Date of Patent: Oct. 17, 2023

(54) ELECTRODE AND A PSEUDO-CAPACITOR BASED ON THE ELECTRODE

(71) Applicant: B.G. NEGEV TECHNOLOGIES & APPLICATIONS LTD., AT BEN-GURION UNIVERSITY, Beer-Sheva (IL)

(72) Inventors: Ahiud Morag, Nes Ziona (IL); Raz Jelinek, Reut (IL)

(73) Assignee: B.G. NEGEV TECHNOLOGIES & APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 77 days.

(21) Appl. No.: 17/422,379

(22) PCT Filed: Jan. 14, 2020

(86) PCT No.: PCT/IL2020/050056
§ 371 (c)(1),
(2) Date: Jul. 12, 2021

(87) PCT Pub. No.: WO2020/148754
PCT Pub. Date: Jul. 23, 2020

(65) Prior Publication Data
US 2022/0122783 A1    Apr. 21, 2022

Related U.S. Application Data

(60) Provisional application No. 62/803,614, filed on Feb. 11, 2019, provisional application No. 62/791,905, filed on Jan. 14, 2019.

(51) Int. Cl.
*H01G 11/86*    (2013.01)
*H01G 11/40*    (2013.01)
(Continued)

(52) U.S. Cl.
CPC ............. *H01G 11/86* (2013.01); *C25D 3/54* (2013.01); *C25D 5/40* (2013.01); *H01G 11/46* (2013.01); *H01G 11/52* (2013.01); *H01G 11/62* (2013.01)

(58) Field of Classification Search
None
See application file for complete search history.

(56) References Cited

U.S. PATENT DOCUMENTS

| 5,035,779 A | 7/1991 | Nishiki et al. |
| 5,963,417 A | 10/1999 | Anderson et al. |

(Continued)

FOREIGN PATENT DOCUMENTS

| CA | 2937819 A1 * | 7/2015 | ............. C25D 11/26 |
| WO | 2005050721 A1 | 6/2005 | |

(Continued)

OTHER PUBLICATIONS

International Search Report issued for International Application No. PCT/IL2020/050056 dated May 11, 2020, 7 pages.

(Continued)

*Primary Examiner* — Dion R. Ferguson
(74) *Attorney, Agent, or Firm* — ROTHWELL, FIGG, ERNST & MANBECK, P.C.

(57) ABSTRACT

The invention provides a process for preparing an electrode, comprising: electrodeposition of metallic ruthenium/ruthenium oxide ($Ru^{(0)}/RuO_2$) coating onto a progressively etched nickel surface; and partial electrochemical oxidation of said metallic ruthenium to ruthenium oxide. The electrode produced and a pseudo-capacitor based on the electrode are also disclosed.

21 Claims, 15 Drawing Sheets

(51) Int. Cl.
*C25D 3/54* (2006.01)
*C25D 5/40* (2006.01)
*H01G 11/46* (2013.01)
*H01G 11/52* (2013.01)
*H01G 11/62* (2013.01)

(56) References Cited

U.S. PATENT DOCUMENTS

| | | | |
|---|---|---|---|
| 9,406,449 B2 | 8/2016 | Xie et al. | |
| 9,805,880 B2 * | 10/2017 | Warren | H01G 11/46 |
| 10,651,478 B2 * | 5/2020 | Pietron | H01M 4/8853 |
| 11,056,288 B2 * | 7/2021 | Ozkan | C23F 1/02 |
| 2004/0041194 A1 | 3/2004 | Marsh | |
| 2008/0094775 A1 * | 4/2008 | Sneh | H01G 9/055 |
| | | | 29/25.42 |
| 2015/0171397 A1 * | 6/2015 | Yamada | H01M 50/454 |
| | | | 429/144 |
| 2015/0259811 A1 * | 9/2015 | Takeuchi | C25B 11/03 |
| | | | 427/125 |
| 2015/0303001 A1 * | 10/2015 | Warren | C25D 11/34 |
| | | | 205/171 |
| 2020/0273633 A1 * | 8/2020 | Ozkan | H01G 11/86 |

FOREIGN PATENT DOCUMENTS

| | | | |
|---|---|---|---|
| WO | 2007121336 A1 | 10/2007 | |
| WO | WO-2015112628 A1 * | 7/2015 | C25D 11/26 |

OTHER PUBLICATIONS

Hu, Chi-Chang et al., "Cyclic voltammetric deposition of hydrous ruthenium oxide for electrochemical capacitors", Journal of the Electrochemical Society, 1999, 146 (7): 2465-2471.

Morag, Ahiud, et al., "Nanostructured Nickel/Ruthenium/Ruthenium-Oxide Supercapacitor Displaying Exceptional High Frequency Response", Advanced Electronic Materials, 2019, 1900844, 9 pages.

Miller et al., "Graphene Double-Layer Capacitor with ac Line-Filtering Performance", Science, 2010, vol. 329, Issue 5999, pp. 1637-1639.

* cited by examiner

FIFURE 4
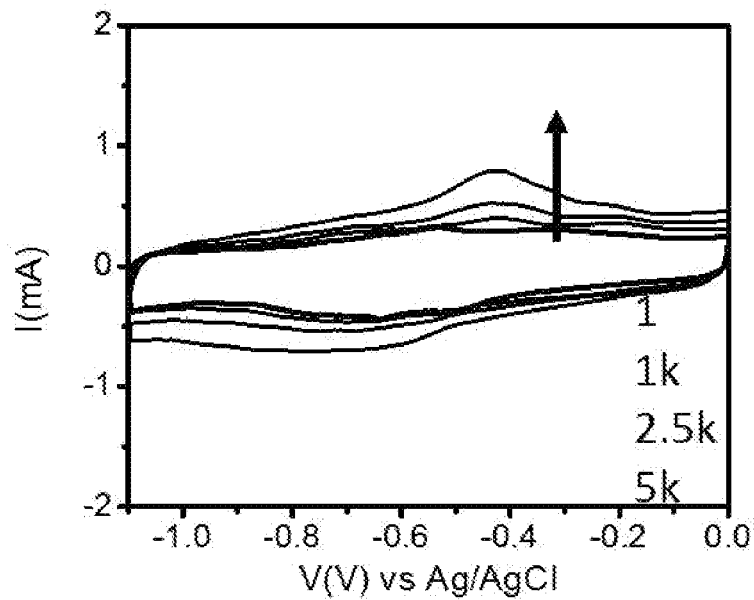
FIGURE 5
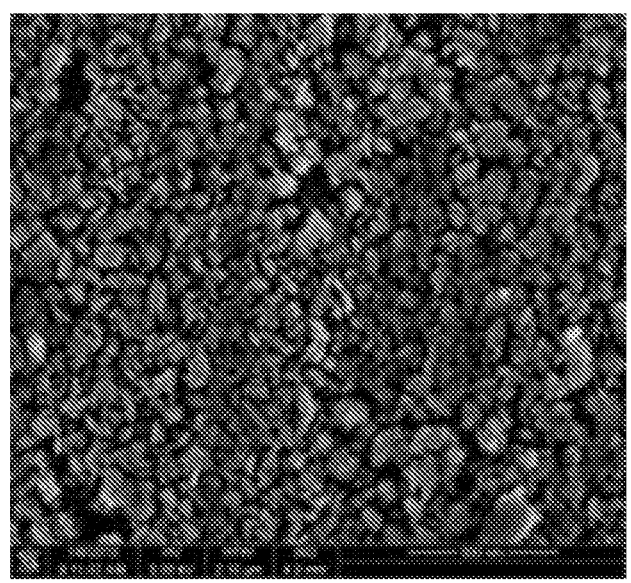

FIGURE 8A
FIGURE 8B
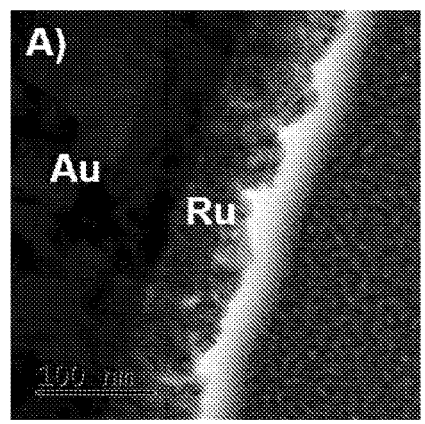
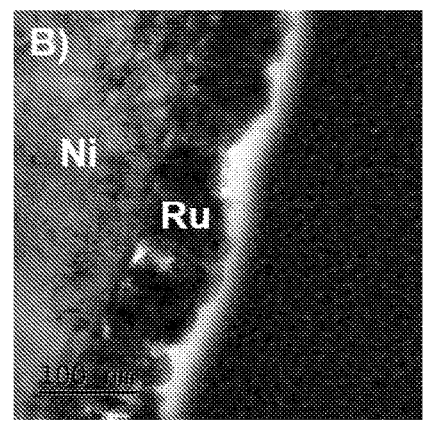
FIGURE 9A
FIGURE 9B
FIGURE 9C
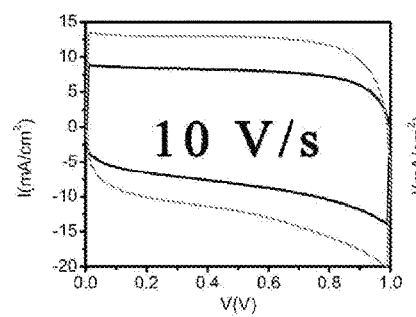
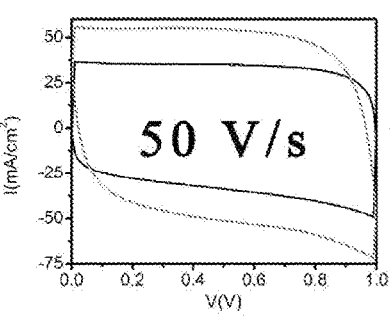
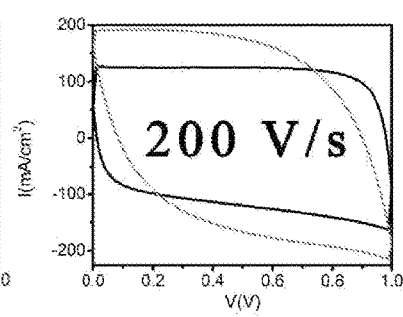
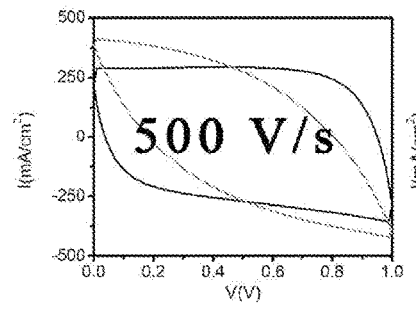
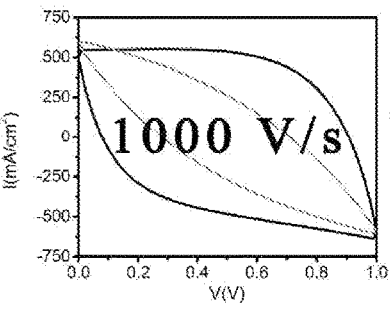
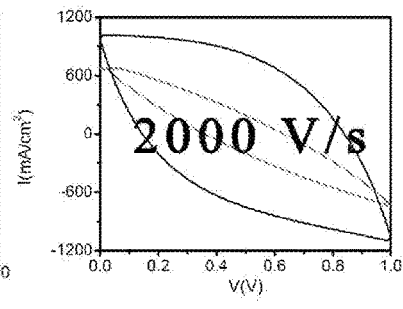
FIGURE 9D
FIGURE 9E
FIGURE 9F FIGURE 20
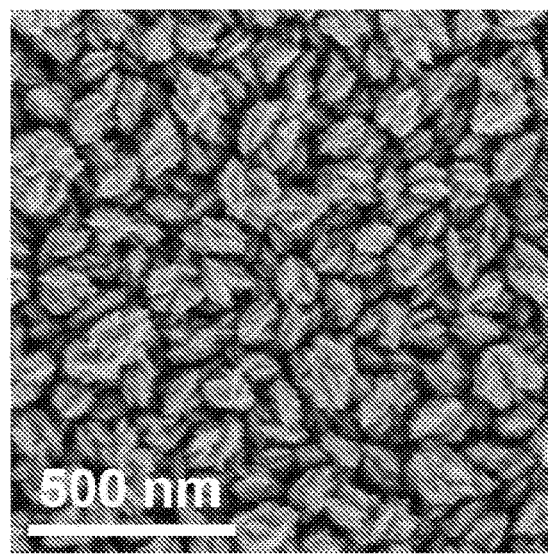
FIGURE 21
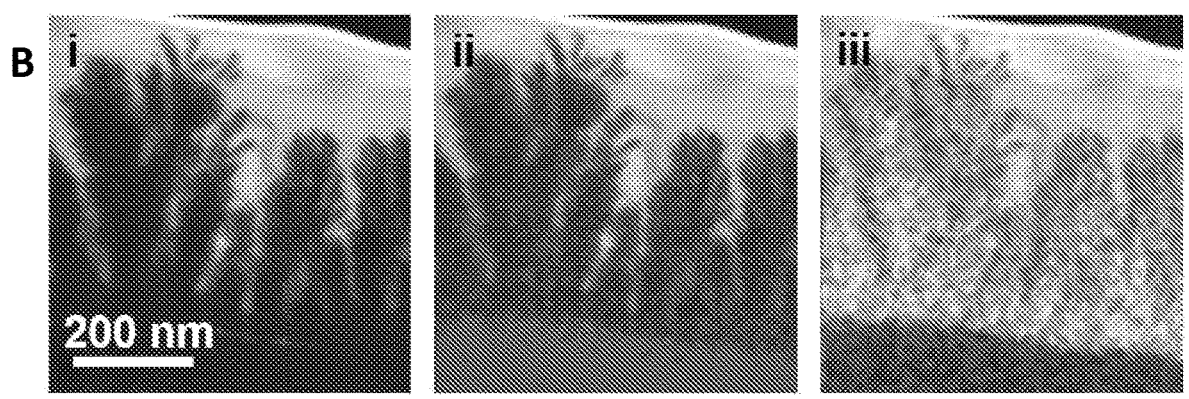
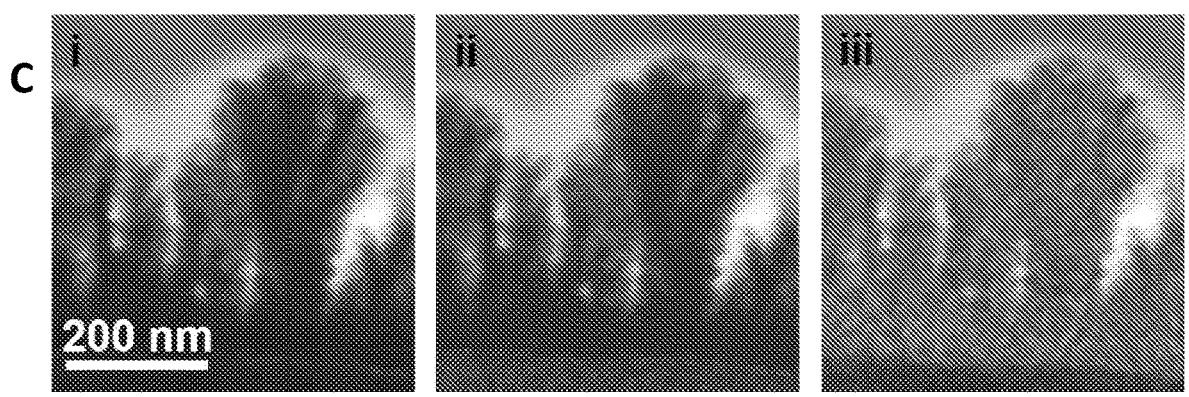

FIGURE 23
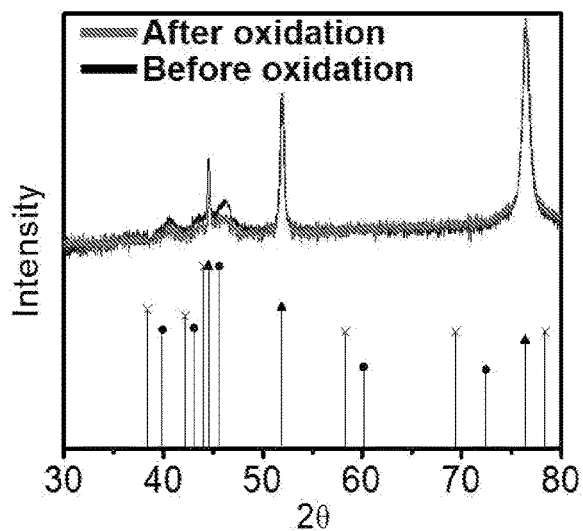
FIGURE 24A
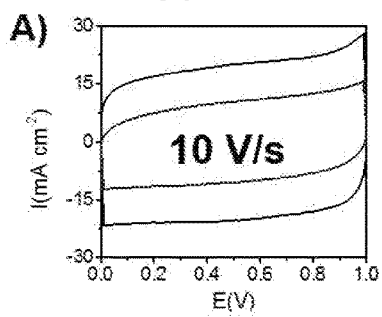
A)
FIGURE 24B
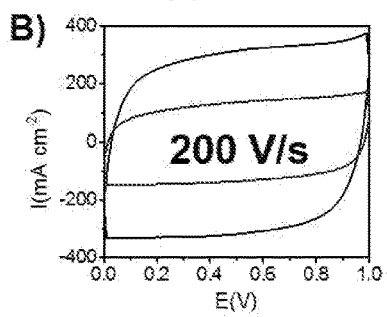
B)
FIGURE 24C
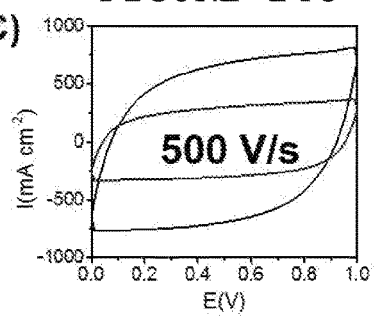
C)
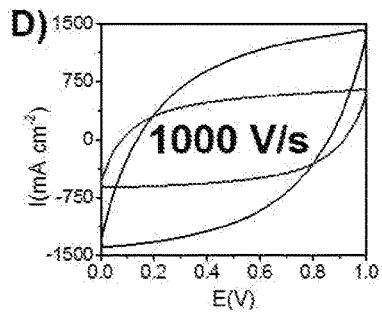
D)
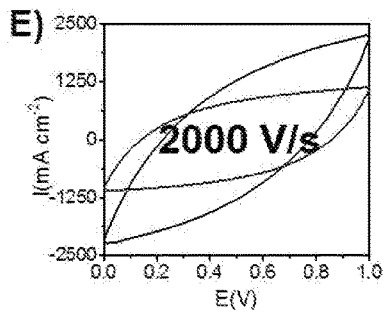
E)
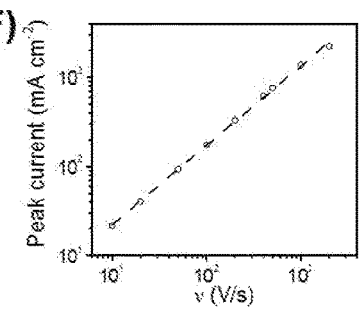
F)
FIGURE 24D
FIGURE 24E
FIGURE 24F FIGURE 25
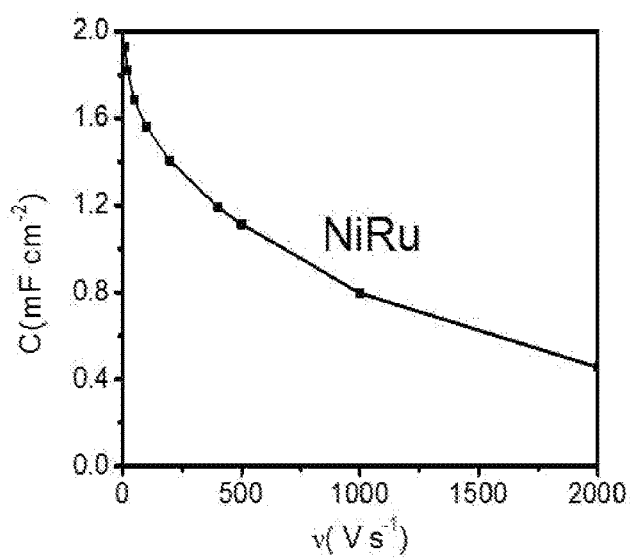
FIGURE 26A  FIGURE 26B  FIGURE 26C
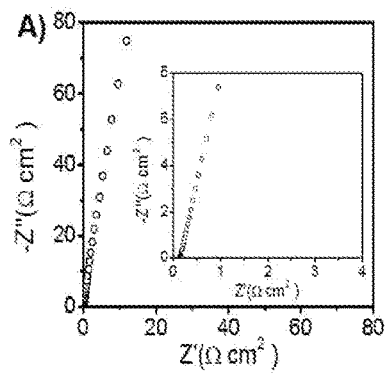 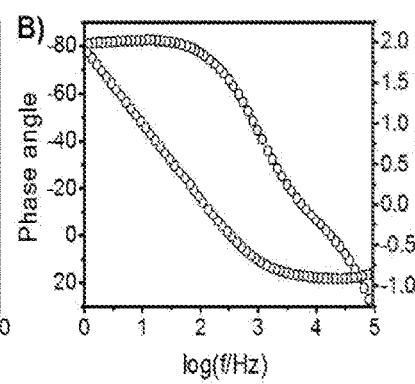 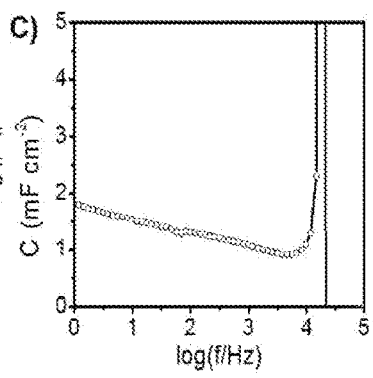

ELECTRODE AND A PSEUDO-CAPACITOR BASED ON THE ELECTRODE

CROSS-REFERENCE TO RELATED APPLICATION(S)

This application is a 35 U.S.C. 371 National Phase Entry Application from PCT/IL2020/050056 filed on Jan. 14, 2020, which claims the benefit of the filing date of U.S. Provisional Application No. 62/791,905 filed on Jan. 14, 2019; and U.S. Provisional Application No. 62/803,614 filed on Feb. 11, 2019, the entire contents of which are incorporated herein by reference.

TECHNICAL FIELD

The invention relates to pseudocapacitive-based supercapacitors, namely, the class of energy storage devices which store charge by reversible oxidation/reduction reactions, occurring in a thin film of a transition metal oxide applied onto a conductive high-surface area electrode.

BACKGROUND

Capacitors are critical components in electronic and microelectronic circuits. Among the most fundamental requirements for capacitor usage is to maintain high-frequency response. This is particularly crucial in applications such as high-energy pulses and alternating current (AC) line-filtering, in which AC signal and spikes in the electricity supply are transformed into stable direct current (DC) signals. Supercapacitors (SCs) have gained significant interest as potential substituents of traditional capacitors. Yet, wider applicability of SCs has been limited due to the rapid decrease in capacitive behavior at high frequencies.

Two parameters, related to the phase angle which indicates the capacitor vs resistor behavior of a capacitor, reflect the significant challenges for using SCs in high frequency applications. Specifically, commercial capacitors usually feature almost −90° phase angles at 120 Hz (the frequency of AC line filtering), indicating a near-ideal capacitor behavior, whereas commercial SCs exhibit phase angles that are close to 0° at 120 Hz, thus operating as resistors. A second reference parameter is the frequency in which the capacitor has a phase angle of −45° corresponding to a device that is equally a capacitor and a resistor. Most SCs exhibit −45° phase angle at frequencies below $10^{-1}$ Hz, rendering them ineffective for AC line filtering and other high-frequencies applications.

Supercapacitors fall into two subcategories: double layer capacitors which store energy owing to the buildup of two layers of opposite charge carriers at the interface between the electrode and electrolyte, and pseudo-capacitors, where energy storage is the result of oxidation/reduction reactions which the electrode material (namely, a transition metal oxide) undergoes.

Miller et al [Science 2010, 329, 1637] were the first to demonstrate that a SC, based on electric double layer capacitance (EDLC) mechanism, may feature good capacitive behavior in high frequencies. While the capacitance of such EDLC-based SCs generally exceeded the values of commercial capacitors by an order of magnitude, their practical potential has been restricted due to the complex synthesis procedures and expensive building blocks.

Pseudocapacitive-based SCs, in comparison, exhibit significantly higher specific capacitance than EDLC-based devices. This property translates into much thinner layers of active material, thereby lesser size requirements. Nevertheless, most SCs reported thus far exhibit rapid decrease in performance in high frequencies, ascribed to the presumed limited kinetics of redox reactions occurring in pseudocapacitive-based SCs.

As pointed out above, the electrode material in pseudo-capacitor generally consists of transition metal oxide. Several transition metal oxides display pseudocapacitive charge storage in aqueous electrolytes. The most prominent pseudo-capacitive metal oxides are ruthenium oxide ($RuO_2$), manganese oxide ($MnO_2$), titanium oxide ($TiO_2$), cobalt oxide ($CO_3O_4$) and vanadium oxide ($V_2O_5$), to name a few. There are different approaches to the creation of the transition metal oxide films onto current collectors. For example, through electrodeposition using metal-containing deposition solution or atomic layering deposition. The latter approach is demonstrated in U.S. Pat. No. 9,406,449 (illustrating the growth of $TiO_2$ and $MnO_2$ on graphene or glassy carbon substrate) and U.S. Pat. No. 9,805,880 (generating $RuO_2$ films onto carbon nanotubes).

SUMMARY OF THE INVENTION

One aspect of the present invention relates to an electrode comprising:

a nickel-containing base (e.g., nickel substrate such as nickel foil, or a nickel alloy foil, with thickness in the range from 5 to 100 µm); and a thin coating of metal/metal oxide (e.g., up to 500 nm), specifically ruthenium/ruthenium oxide, applied onto the nickel-containing base.

The surface of the nickel base, onto which the coating is applied, displays high degree of roughness. Transmission Electron Microscopy (TEM) analysis of the lateral side of the electrode indicates that the interface between the nickel-containing base and the coating applied thereon is not very uniform, showing the presence of some voids.

The electrode is conveniently prepared using electro-chemical techniques, based on fast etching and deposition cycles of the nickel-containing base and the coating, respectively. For example, with the aid of cyclic voltammetry between suitable switching potentials and the presence of added salt (e.g., $Na_2SO_4$) in the $Ru^{3+}$ deposition solution, it is possible to create a rough nickel surface and electrodeposited ruthenium ($Ru^0$) coating thereon; the corresponding oxide is generated by partial electrochemical oxidation of the electrodeposited $Ru^0$. In this way, an electrode with a pseudo-capacitor coating on a metallic $Ru^0$ that can operate at high frequencies is produced.

The bulk of the coating consists essentially of $Ru^{(0)}$. That is, the oxide is preferentially located atop of $Ru^{(0)}$ layer interposed between the nickel base and said outermost pseudo-capacitor ($RuO_2$) layer. The proportion between $Ru^0/RuO_2$ on said top layer (e.g. the surface) of the coating applied onto the nickel base, as determined by the intensity of the peaks assigned to $Ru^0$ and $RuO_2$ forms in a deconvoluted X-ray photoelectron emission spectrum (XPS), may vary from 7:1 to 1:7, e.g., from 3:1 to 1:3, for example, from 2:1 to 1:2 (the level of oxidation depends on the activation of the electrode as discussed below; $Ru^{(0)}$ is the predominant form in the surface of the as-formed electrodeposited coating; upon activation, the surface $Ru^{(0)}$ is gradually transformed into the corresponding oxide).

Another aspect of the invention is a process for preparing an electrode, comprising:
electrodeposition of metallic ruthenium/ruthenium oxide) ($Ru^{(0)}/RuO_2$) coating onto a progressively etched nickel surface; and
partial electrochemical oxidation of said metallic ruthenium to ruthenium oxide.

Electrodeposition and subsequent electrochemical oxidation are preferably achieved with the aid of cyclic voltammetry. More specifically, a process for preparing the above-mentioned electrode is provided, comprising:
providing a 2-electrodes or 3-electrodes arrangement suitable for cyclic voltammetry, wherein the working electrode is a nickel-containing substrate (e.g., a foil) immersed in an aqueous solution of ruthenium salt in the presence of a suitable salt additive such as sodium sulfate;
applying a potential across the working electrode and a reference electrode (for example, Ag/AgCl) and sweeping the potential negatively between a first value (for example, 0 V) and a second value (for example, −1.1V) versus the reference electrode, reversing the scan to the positive direction, and repeating the potential scan for many cycles, wherein the scan rate is not less than 1 V/s, preferably not less than 5 V/s, e.g. 10 V/s, to deposit) $Ru^{(0)}/RuO_2$-containing layer; and
optionally electrochemically oxidizing $Ru^{(0)}$ to ruthenium oxide (i.e., activation step).

The performance of the electrode fabricated through the etching/deposition process outperforms previous electrodes based only on deposition processes. A capacitor composed of two electrodes can be assembled, demonstrating high capacity density compared to commercial capacitors and capable of operating at high frequencies.

Accordingly, another aspect of the invention is an electrochemical capacitor comprising a pair of spaced apart electrodes, a separator disposed in the space between said electrodes and an electrolyte (e.g., neutral aqueous electrolyte), wherein at least one of said electrodes is as described herein. A particularly useful separator consists of a film of polymeric microfibers, (e.g., carboxylated electrospun polystyrene microfibers obtained by electrospinning polystyrene solution in dimethylformamide).

Another aspect of the invention relates to the addition of $Ni^{2+}$ source to the deposition solution, which results in co-deposition of $Ni^{(0)}$ alongside $Ru^{(0)}$ in the form of $Ni^{(0)}Ru^{(0)}$ alloy onto the nickel substrate. Post-deposition electrochemical oxidation leads to conversion of $Ru^{(0)}$ into oxide form, that is, creation of an outer electrochemically active $RuO_2$ layer on the $Ni^{(0)}Ru^{(0)}$ alloy. The incorporation of electrodeposited $Ni^{(0)}$ into the coating (or more precisely, into the interface between the nickel base and the $RuO_2$ layer) serves twofold purpose. First, increase of the morphology of the deposited layer, i.e., of the surface area exposed to the electrochemical reaction, compared to the deposition of $Ru^{(0)}$ alone. Second, the deposited Ni contributes to the high conductivity of the interface layer which is necessary to acquire efficient operation at high current densities.

Accordingly, another aspect of the invention is an electrode comprising:
nickel-containing base (e.g., nickel substrate such as nickel foil, or a nickel alloy foil, with thickness in the range from 5 to 100 μm); and
a thin coating comprising $Ni^{(0)}Ru^{(0)}$ alloy phase applied onto the nickel-containing base, with $RuO_2$ surface layer on said alloy.

The $Ni^{(0)}Ru^{(0)}$ alloy phase is generally ruthenium-rich. The deposited $Ni^{(0)}Ru^{(0)}$ alloy exhibits higher surface area compared to the deposition of $Ru^{(0)}$ alone.

Thus, in its two major variants, the coating created onto the nickel base (i.e., onto the nickel current collector) comprises metallic component, namely electrodeposited $Ru^{(0)}$, or electrodeposited $Ni^{(0)}Ru^{(0)}$ alloy, and an oxide component, namely, $RuO_2$, produced by post-deposition oxidation (e.g., electrochemical oxidation). The two electrodes described herein are designated accordingly:
$Ni_{(base)}/Ru^{(0)}/RuO_2$ (indicating the ruthenium/ruthenium oxide-coated nickel; coating thickness may be up to 100 nm); and
$Ni_{(base)}/Ni^{(0)}Ru^{(0)}/RuO_2$ (indicating the nickel-ruthenium alloy/ruthenium oxide-coated nickel; coating thickness may be up to 500 nm).

The oxide $RuO_2$ is meant herein to include hydrous forms, which are sometimes collectively indicated in the literature by the notation $RuO_2 \cdot xH_2O$. Hence, in the context of the present invention, all ruthenium oxide forms are encompassed by "$RuO_2$".

Specifically, the new capacitors we developed can be integrated in high current AC line rectifiers resulting in significant reductions of rectifier dimensions. The high capacitance and ability to work at high frequencies make the capacitor suitable for integration also in applications which require high burst of energy, for example military applications that need high energy burst and cannot rely on combustion systems.

BRIEF DESCRIPTION OF THE DRAWINGS

FIG. 4 is a cyclic voltammogram of Ru deposition on a bare Au current collector in 1M Na2SO4 solution.

FIG. 5 is an SEM image showing the surface morphology of the coated Ni electrode, produced after 2500 deposition cycles followed by oxidation.

FIGS. 8A and 8B are transmission electron microscopy (TEM) images of the cross-section of the Ru/RuO2-coated gold and Ru/RuO2-coated nickel electrodes, respectively.

FIGS. 9A to 9F show cyclic voltammograms curves recorded for symmetric supercapacitors devices assembled as described in Example 6.

FIG. 20 is a SEM image of the surface morphology of the NiRu/RuO2 layer of Ni(base)/Ni(0)Ru(0)/RuO2 electrode.

FIG. 21$i$ is cross-section scanning transmission electron microscopy (STEM) images of the structure of the electrodeposited layer before the electrochemical oxidation of Ru (FIG. 21B$i$) and after the oxidation (FIG. 21C$i$).

FIG. 21$ii$ is electron dispersion spectroscopy (EDS) elemental maps of the distribution of Ni across the deposited film before the electrochemical oxidation of Ru (FIG. 21B$ii$) and after the oxidation (FIG. 21C$ii$).

FIG. 21$iii$ is electron dispersion spectroscopy (EDS) elemental maps of the distribution of Ru across the deposited film before the electrochemical oxidation of Ru (FIG. 21B$iii$) and after the oxidation (FIG. 21C$iii$).

FIG. 23 is X-ray diffraction (XRD) spectra of as-deposited Ni(base)/Ni(0)Ru(0) (black) and after electrochemical oxidation Ni(base/Ni(0)Ru(0) /RuO2 (red) presented on a logarithmic scale.

FIGS. 24A-E are the CV curves recorded for symmetric supercapacitors devices assembled based on a pair of Ni(base)/Ni(0)Ru(0)/RuO2 electrodes using 2.5k deposition cycles in 1M Na2SO4 electrolyte solution at the voltage range of 0 to 1 volt and scan rates of 10 V/s (FIG. 24A), 200 V/s (FIG. 24B), 500 V/s (FIG. 24C), 1000 V/s (FIG. 24D) and 2000 V/s (FIG. 24E).

FIG. 24F presents the discharge peak current density as a function of the scan rate, showing a linear behavior up to 1000 V s-1.

FIG. 25 is a plot of the capacitance as a function of the scan rate for a symmetric supercapacitor.

FIG. 26A is a Nyquist plot of a symmetric supercapacitor device in a frequency range of 100kHz-1Hz.

FIG. 26B is a plot of the phase angle as a function of the frequency (upper curve) and the overall impedance as a function of the frequency (lower curve) for the symmetric supercapacitor device.

FIG. 26C is a plot of the capacitance as a function of the frequency for the symmetric supercapacitor device.

DETAILED DESCRIPTION OF THE INVENTION

Figure 1:
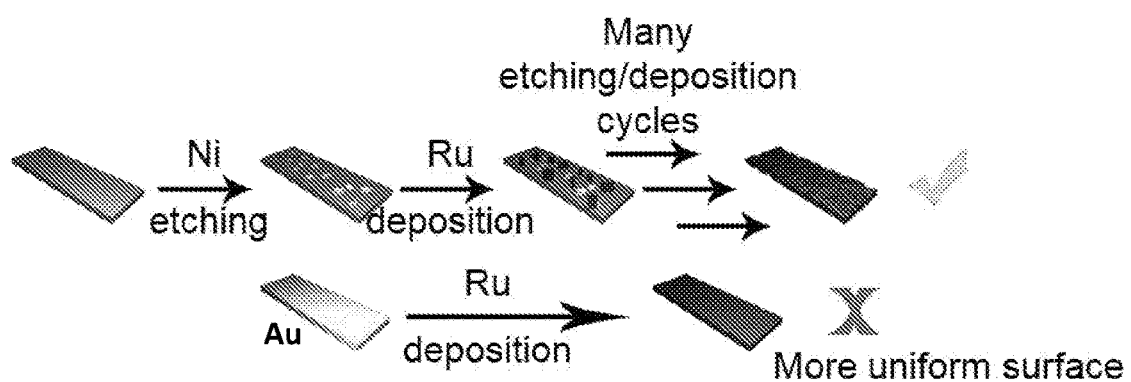
FIG. 1 shows the process of etching/deposition of the invention.

The process of etching/deposition is presented in FIG. 1. The thickness of the nickel current collector onto which deposition takes place may vary from 1 to 50 μm, and the active area to be coated is from 0.1 to 20 cm$^2$, chiefly restricted by the dimensions of the deposition set-up. The deposition solution is an aqueous solution comprising dissolved Ru ion source, e.g., Ru$^{3+}$ salt such as ruthenium chloride (e.g., in hydrated form RuCl$_3$·xH$_2$O) at concentration from 0.001 to 0.1 M, e.g., from 0.005 to 0.015 M.

A key feature of the present invention is that the nickel electrode is etchable under the conditions of the electrodeposition method, to achieve ruthenium deposition onto a progressively etched nickel surface. Cyclic voltammetry has been shown to be useful for this purpose on condition that a salt additive such as alkali sulfate is present in the deposition solution. Experimental results reported below indicate that cyclic voltammetry using a nickel foil as a working electrode in 1M Na$_2$SO$_4$ solution has led to changes in the surface morphology of the working electrode. Similar changes were not observed in the absence of added sulfate salt (i.e., cyclic voltammetry in water). That is, the pronounced etching and enhanced surface area of the nickel electrode induced by the consecutive CV cycles account for the good performance at higher charge/discharge rates. Notably, as shown in FIG. 1 and comparative data presented below, attempts to induce surface etching of gold working electrode through cyclic voltammetry conducted in sulfate solution by consecutive CV cycles were unsuccessful. This difference underscores the important role of the current collector in affecting electrochemical properties of supercapacitors, i.e., nickel as opposed to gold. That is, when Ni electrode is used during the deposition process, an etching process of the Ni electrode occurs due to instability of the Ni in the deposition voltage window in the presence of suitable salt additive in the deposition solution.

Suitable salt additives which are present in the deposition solution include sulfate salts, e.g., alkali sulfate, owing to their electrochemical inertness across the voltage window used in the deposition step. The concentration of the sulfate salt in the deposition solution may vary from 0.1 to 1.5 M, for example, from 0.25 to 1 M.

As mentioned above, the deposition solution may advantageously include $Ni^{2+}$ salt, such as $NiSO_4$ (e.g., in hydrated forms, $NiSO_4.7H_2O$) at typical concentration ranging from 0.005 to 0.015 M. To achieve efficient co-deposition of both metals and creation of the $Ni^{(0)}Ru^{(0)}$ alloy, roughly equimolar amounts (from 3:5 to 5:3, e.g., about 1:1 molar ratio of the two metal precursors) are present in the solution. For example, deposition solutions which contains from 0.0075 M to 0.0125 M of each salt can be used.

To produce the electrodes of the invention through cyclic voltammetry, a three-electrode set-up can be used, in which the nickel is the working electrode, the counter electrode may be a platinum wire or coil and the reference electrode, versus which potential is determined, may be Ag|AgCl (3M KCl). Other reference electrodes can also be used, such as saturated calomel electrode.

As mentioned above, potential sweep occurs by sweeping the potential negatively between a first value (for example, 0 V) and a second value (for example, the second value is from −1.0 to −1.2V, e.g. −1.1V) versus the reference electrode, reversing the scan to the positive direction, and repeating the potential scan for many cycles. The scan rate and number of cycles are adjusted to etch the surface of the nickel base. For example, A suitable scan rate is usually not less than 5 V/s, e.g., from 7 to 12 V/s, such 10 V/s, and the number of cycles is at least 1000, for example, from 1000 to 5000, e.g., from 2000 to 3000.

Regarding the conditions of the post-deposition oxidation step, whereby electrodeposited ruthenium is converted to ruthenium oxide, it is preferably accomplished electrochemically, conveniently with the aid of cyclic voltammetry (or alternatively, under constant potential or constant oxidation current).

To this end, the three-electrode set up mentioned above can be used, with $Ni_{(base)}/Ru^{(0)}$ or $Ni_{(base)}/Ni^{(0)}Ru^{(0)}$ serving as the working electrode, platinum as the counter electrode and Ag|AgCl (3M KCl) as the reference electrode. Regarding the electrolyte solution, it should be noted that acidic solutions are precluded, due to the instability of nickel in acidic environment. But other than this constraint, salt solutions can be used, such as the alkali sulfate solution mentioned above, e.g., $Na_2SO_4$ (1M). The working voltage window for ruthenium oxide generation is preferably from 0 and +0.8V. Sweeping the potential across this window for at least 1 k cycles, for example 5k cycles, at a scan rate in the range from 1 to 20 V/s, for example, 10 V/s, leads to efficient creation of $RuO_2$ layer.

Next, a pair of electrodes of the invention are assembled to produce a symmetric supercapacitor (asymmetric supercapacitors utilizing just one electrode of the invention are also contemplated). In general, the active area of each electrode is from 0.1 to 0.5 $cm^2$. The electrolyte disposed in the space between the electrodes is preferably an aqueous (non-acidic as explained above) electrolyte solution, such as $Li_2SO_4$ and $Na_2SO_4$. As to the separator, major considerations in choosing a separator include nonconductivity, chemical resistance to the electrolyte solution, mechanical resistance and good wettability. Cellulose paper and polymer-based separators (possessing either fibrous structure or consisting of monolithic networks with pores) may be used. Especially preferred separator film in the supercapacitor of the invention is based on carboxylated electrospun polystyrene microfibers film. That is, the separator comprises polystyrene (PS) fibers which were electrospun from a polystyrene solution, and were then carboxylated with the aid of an oxidizer. For example, PS fibers were electrospun, e.g., in an organic solvent such as dimethylformamide (30% w/v), on a glass for not less than min (under a 20 kV voltage and 22 cm between needle and collector) and were annealed at 100° C. for at least 15 min. Following electrospinning, carboxylation of the PS microfibers was carried out by placing the PS fibers under heating (e.g., at 70° C.) in a 0.6 M $H_2SO_4$ solution containing an oxidant such as $KMnO_4$ (for example, at concentration of 50 g $L^{-1}$) for 3 h. The oxidation product, namely, $MnO_x$ precipitate, can be removed by immersing the PS fibers in a 6 M HCl for 24 h. The film was than rinsed with water 3 time for several hours each time. Until use, the separator film is kept in the electrolyte solution (e.g., 1 M solution of $Na_2SO_4$ electrolyte solution) to avoid drying of the film.

The performance of symmetrical capacitors based on a pair of $Ni_{(base)}/Ru^{(0)}/RuO_2$ electrodes, or a pair of $Ni_{(base)}/Ni^{(0)}Ru^{(0)}/RuO_2$ electrodes, with a neutral (e.g., 1M $Na_2SO_4$) electrolyte solution disposed between the pair of electrodes and carboxylated electrospun polystyrene microfibers film serving as separator, was investigated using cyclic voltammetry, galvanostatic charge/discharge and electrochemical impedance measurements. For example, the $Ni_{(base)}/Ru^{(0)}/RuO_2$-based supercapacitor demonstrates excellent capacitor behavior at high frequencies with capacitance of not less than 1.8 (e.g., 1.87) mF $cm^{-2}$ at a current density of 10 mA $cm^{-2}$, a near rectangular shape at a scan rate of 1000 V $s^{-1}$, and a phase angle of −79.8° at 120 Hz. The $Ni_{(base)}/Ru^{(0)}/RuO_2$-based supercapacitor can operate at power densities above 1500 mW $cm^{-2}$ (88 kW $cm^{-3}$) with maximum energy densities exceeding 0.58 μWh $cm^{-2}$ (34 mWh $cm^{-3}$).

The $Ni_{(base)}/Ni^{(0)}Ru^{(0)}/RuO_2$-based supercapacitor shows even better results, e.g., capacitance of not less than 2.1 (e.g., 2.29) mF $cm^{-2}$ at a current density of 10 mA $cm^{-2}$. In addition, the $Ni_{(base)}/Ni^{(0)}Ru^{(0)}/RuO_2$ based device can deliver energy densities as high as 0.71 μWh $cm^2$ and power densities as high as 3000 mW $cm^{-2}$.

Possible designs of electrochemical capacitors, fabrication methods and applications thereof are known in the art and are described, for example, in "Electrochemical Supercapacitors for Energy Storage and Conversion (Kim et al.; Handbook of Clean Energy Systems published by John Wiley & Sons (2015)]. That is, several capacitors are often combined in serial and parallel circuits, depending on whether higher voltage or higher power is needed. On account of their ability to be charged and discharged rapidly, showing good stability and high capacitive retention over repeated cycling, and high frequency response, the capacitors of the invention can be integrated in many applications such as high energy pulses and alternating current line-filtering, where aluminum electrolytic capacitors are currently being used commercially.

EXAMPLES

Methods

XPS analysis was carried out using Thermo Fisher ESCALAB 250 instrument with a basic pressure of $2\times10^{-9}$ mbar. The samples were irradiated in two different areas using monochromatic Al Kα, 1486.6 eV X-rays, using a beam size of 500 μm. The high energy resolution measurements were performed with pass energy of 20 eV. The core level binding energies of the Ru 3d peaks were normalized by setting the binding energy for the C1s at 284.8 eV.

HRTEM samples were prepared using focus ion beam. HRTEM images were recorded on a 200 kV JEOL JEM-2100F.

Scanning electron microscopy (SEM) images were recorded on Verios 460L FEI (Czech Republic).

X-ray diffraction (XRD) data was obtained using Panalytical Empyrean powder diffractometer (PANalytical, Almelo, Netherlands) equipped with a parabolic mirror on incident beam providing quasi-monochromatic Cu Kα radiation (λ=1.54059 Å) and X'celeator linear detector. Data were collected in the grazing geometry with constant incident beam angle equal to 1° in a 2θ range of 30-80° with a step equal to 0.05°.

Lamellas for cross section TEM imaging were fabricated using a Helios G4 UC dual beam focus ion beam (FIB)/SEM (Thermo Fisher Scientific). The sample was covered with 0.5 μm of carbon using electron deposition followed by another 1 μm of carbon ion deposition. Next, Ga ion beam was used to mill around the protective layer and an Easylift (Thermo Fisher Scientific) micromanipulator was used to lift out the lamella from the bulk and attached it to a TEM grid. Further reduction of thickness and cleaning of the lamella was done with 30 kV Ga ion beam probe from both sides to a thickness of ~150 nm and then with 5 kV probe until the thickness was around 50 nm.

Electrochemical measurements: CV was conducted at voltage ranges between 0-1V. Galvanostatic charge/discharge measurements were conducted at current density in the range of 10-2000 mA cm$^{-2}$ in a voltage window of 1.5V. Electrochemical impedance measurements were conducted between 1 Hz-100 kHz with a sinus amplitude of 5 mV. Cycle stability measurements were conducted in a scan rate of 10 V s$^{-1}$ in a voltage window of 0-1 V or 0-1.5 V for 1-3 million cycles. The electrochemical measurements were conducted in two-electrodes configuration on either a CH instrument 760C (Austin, Tex.) or a Bio-Logic SP-150 (Claix, France).

Example 1

Ni$_{(base)}$/Ru$^{(0)}$/RuO$_2$ Electrode Fabrication

The deposition of Ru was conducted on a commercial 20 μm thick Ni foil. The deposition solution was 0.01M RuCl$_3$+1M Na$_2$SO$_4$ solution. The deposition was conducted using a 3-electrodes configuration with Ni as the working electrode, Pt wire as the counter electrode and Ag/AgCl (3 M KCl) as the reference electrode. The deposition was achieved using CV cycles between 0 V and −1.1V vs reference electrode at a scan rate of 10 V/s. Deposition for 1 k, 2.5 k and 5 k cycles were checked. After deposition of Ru, oxidation to RuO$_2$ is obtained by running CV for 5 k cycles at a scan rate of 10 V/s in a voltage window of 0 and 0.8V for single electrode in a 1M Na$_2$SO$_4$ solution. The deposition/oxidation was conducted on a SP-150 Bio-Logic device (Claix, France).

Example 2 (Comparative)

Au$_{(base)}$/Ru$^{(0)}$/RuO$_2$ Electrode Fabrication

The deposition/oxidation procedure of Example 1 was repeated, but this time the Ru/RuO$_2$ coating was applied on electrode consisting of silicon wafer with 200 nm evaporated Au [200 nm Au on top of 50 nm evaporated Ti].

Example 3

Effect of Cyclic Voltammetry in Water or in Sodium Sulfate Solution on the Surface of Nickel Foil Cyclic voltammetry measurements of a nickel electrode conducted in 1M Na$_2$SO$_4$ aqueous solution were compared to cyclic voltammetry in water (using three-electrode configuration, with Ni serving as the working electrode, Pt as the counter electrode and Ag|AgCl as the reference electrode), to investigate the effect of Na$_2$SO$_4$ on the morphology of the surface of a bare nickel foil under the conditions of the deposition process described in previous examples, i.e., CV cycles between 0 V and −1.1V versus reference electrode at a scan rate of 10 V/s after 1, 1 k, 2.5 k, and 5 k cycles.

Figure 2A:
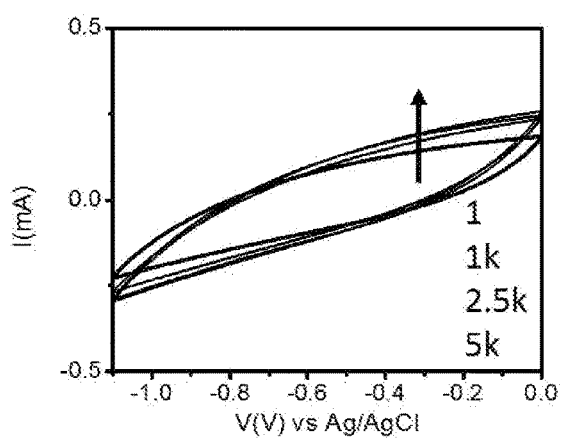
FIGS. 2A and 2B are cyclic voltammograms (CV) of Ru deposition on the nickel foil with water and 1M Na2SO4 solution as electrolytes, respectively.
Figure 2B:
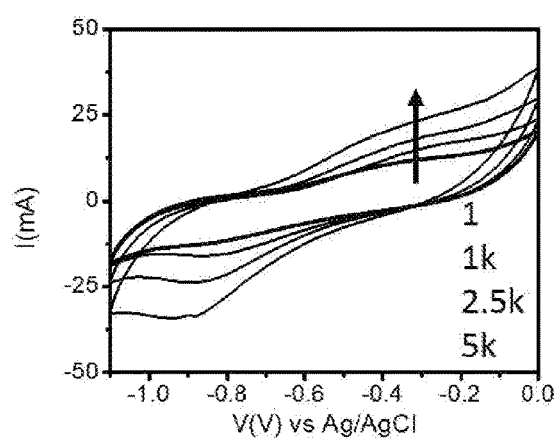
Figure 3A:
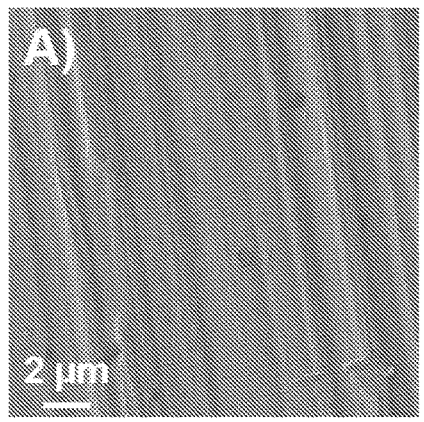
FIGS. 3A and 3B are scanning electron microscopy (SEM) images of the commercial nickel foil and the nickel foil after 5000 cyclic voltammetry cycles in 1M Na2SO4 solution.
Figure 3B:
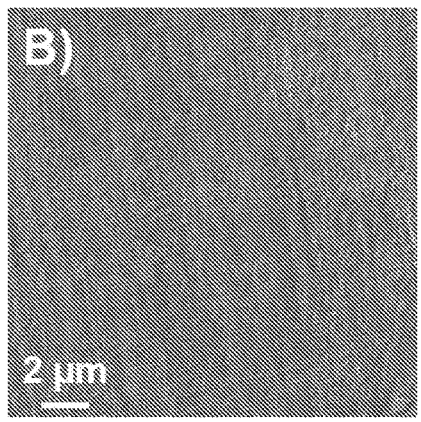
Figure 3C:
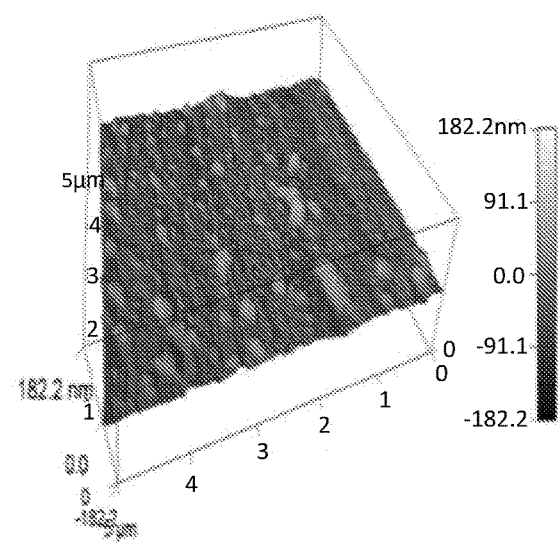
FIGS. 3C and 3D are atomic force microscopy (AFM) 3D topography maps of Ni surface before (FIG. 3C) and after (FIG. 3D) CV 5000 cycles in 1M Na2SO4 solution.
Figure 3D:
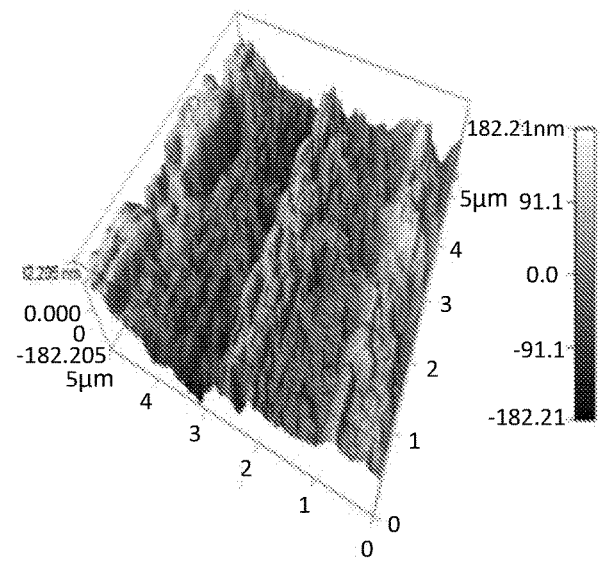

The results shown in FIGS. 2A and 2B indicate the stability of the nickel foil when the electrolyte is water (FIG. 2A, where only small changes are noted in the cyclic voltammograms), as opposed to increase in signal clearly seen in FIG. 2B, indicating that the surface of the Ni foil has been undergoing changes during cyclic voltammetry in 1M Na$_2$SO$_4$ solution, i.e., under the experimental condition of the deposition process illustrated in Example 1. SEM images shown in FIGS. 3A and 3B of a commercial Ni foil and the same foil after having been subjected to 5000 CV cycles, respectively, attest to the increased surface roughness of the nickel foil after the cyclic voltammetry in 1M Na$_2$SO$_4$ solution, in line with the cyclic voltammograms of FIG. 2B. Further support can be found in atomic force microscopy (AFM) 3D topography maps of Ni surface before (FIG. 3C) and after (FIG. 3D) CV 5 k cycles in 1M Na$_2$SO$_4$ solution, showing pronounced etching and increased surface of the nickel resulting from the consecutive CV cycles.

Example 4 (Comparative)

Effect of Cyclic Voltammetry in Sodium Sulfate Solution on the Surface of Gold Foil The results of cyclic voltammetry measurements of a bare Au current collector, namely, silicon wafer with 50 nm and 200 nm evaporated Ti and Au, respectively, in 1M Na$_2$SO$_4$ solution using the same set-up and experimental conditions as in Example 3 are shown in FIG. 4. The nearly negligible change in current indicates that Au electrode is stable under the deposition conditions. That is, the surface of the Au electrode is resistant to etching when subjected to cyclic voltammetry in sodium sulfate solution.

Example 5

Characterization of Ni$_{(base)}$/Ru$^{(0)}$/RuO$_2$ Electrode (of the Invention) and Au$_{(base)}$/Ru$^{(0)}$/RuO$_2$ Electrode (Comparative)

Scanning electron microscopy (SEM) image showing the surface morphology of the coated Ni electrode (produced after 2500 deposition cycles followed by oxidation) is shown in FIG. 5, indicating the electrodeposited layer, i.e., formation of Ru/RuO$_2$-coated Ni electrode.

Figure 6A:
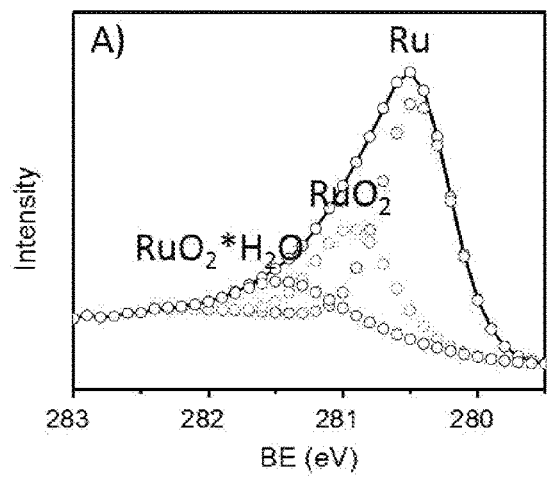
FIGS. 6A and 6B show X-ray photoelectron spectroscopy (XPS) analysis of the composition of the as-deposited coating and the composition of the coating produced through the post-deposition electrochemical oxidation, respectively.
Figure 6B:
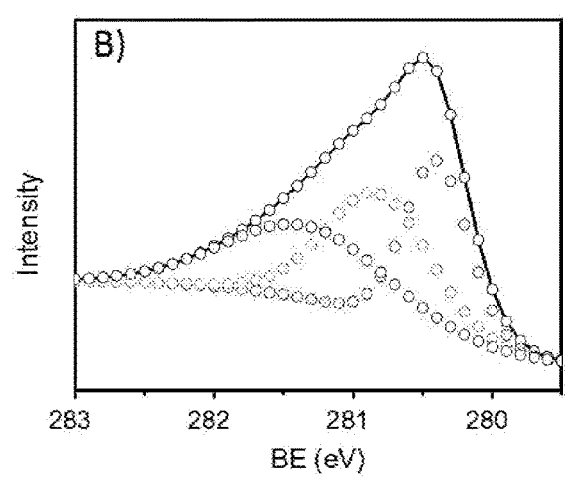

X-ray photoelectron spectroscopy (XPS) analysis was performed to determine the composition of the as-deposited coating (spectra is shown in FIG. 6A) and the composition of the coating produced through the post-deposition electrochemical oxidation (spectra is shown in FIG. 6B). The red, green and blue are products of deconvolution and represent Ru, RuO$_2$ and RuO$_2$·xH$_2$O components of the film surface, respectively. Ru$^{(0)}$ content of the deposited film is 63% (6A), and is decreased to 32% after oxidation (6B). Hence, the concentration of ruthenium oxide and its hydrated form is ~40% prior to electrochemical oxidation, reaching ~70% after oxidation. It is seen that Ru$^{(0)}$ still remains a significant component of the coating layer in the final electrode.

Figure 7A:
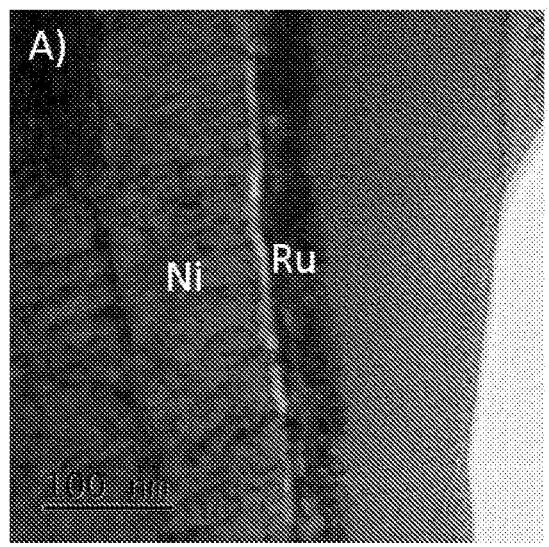
FIG. 7A is a high-resolution transmission electron microscopy (HRTEM) image of the coating layer after 2500 deposition cycles followed by oxidation.
Figure 7B:
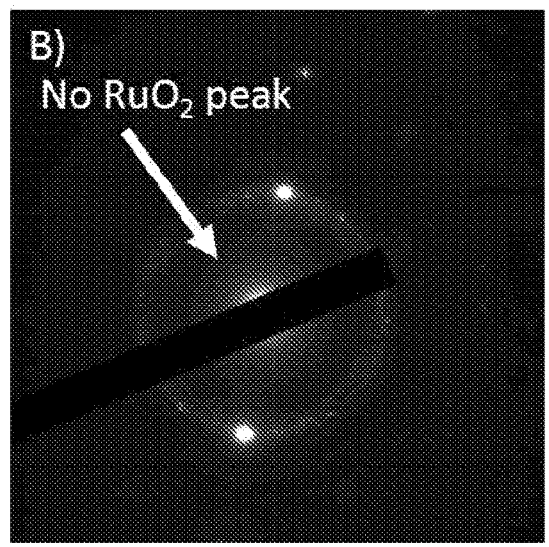
FIG. 7B is a diffraction pattern of the coating layer after 2500 deposition cycles followed by oxidation.

High resolution transmission electron microscopy (HR-TEM) images shown in FIGS. 7A and 7B lend further support to the conclusion that Ru$^{(0)}$ is present in the coating layer after the CV oxidation cycles. HRTEM image of the cross section the coating layer confirm the presence of crystalline Ru$^{(0)}$, showing only signal of metallic ruthenium, indicating that the bulk of the coating consists essentially of Ru$^{(0)}$. On the other hand, no RuO$_2$ crystalline peaks were observed in the diffraction analysis, indicating the amorphous nature of the RuO$_2$ component of the coating layer.

To illustrate the differences between Ru/RuO$_2$-coated nickel and Ru/RuO$_2$-coated gold electrodes, TEM images of the cross-section of the electrodes are given in FIGS. 8A and 8B respectively, revealing the interface between the metal current collector (Ni or Au) and the ruthenium coating layer deposited thereon. The ruthenium layer on the Au electrode seems to be denser and more uniform, while the interface region between the Ni current and the ruthenium coating has more voids, which can explain the lower resistance and better performance at high scan rates, as shown by the electrochemical studies reported below.

Example 6

Assembly of Symmetric Supercapacitors Composed of a Pair of Ni$_{(base)}$/Rum/RuO$_2$ Electrodes (of the Invention) or a Pair of Au$_{(base)}$/Ru$^{(0)}$/RuO$_2$ Electrodes (Comparative)

Two symmetric supercapacitors were fabricated, one based on a pair of the electrodes of Example 1 and the other based on a pair of the comparative electrodes of Example 2. Coated electrodes produced following 2500 deposition cycles were used for creation of the symmetric supercapacitors.

Step 1: Spacer Fabrication

Polystyrene (PS) fibers were electrospun from a polystyrene solution in dimethylformamide (30% w/v), on a glass for 40 min (under a 20 kV voltage and 22 cm between needle and collector) and were annealed at 100° C. for 15 min. Following electrospinning, carboxylation of the PS microfibers was carried out by placing the PS fibers at 70° C. in a 0.6 M H$_2$SO$_4$ solution containing KMnO$_4$ (50 g L$^{-1}$) for 3 h. MnO$_x$ precipitate was removed by immersing the PS fibers in a 6 M HCl for 24 h. The film was than rinsed with water 3 time for several hours each time. Finally, the film was kept in a 1 M solution of Na$_2$SO$_4$ prior to use to avoid drying of the film.

Step 2: Device Assembly

The device (i.e., symmetric supercapacitor) was composed of two electrodes with the same area pressed between the PS spacer socked in 1 M Na$_2$SO$_4$ solution. The device was encapsulated using scotch tape and was pressed using plastic clamps. For the cycle stability measurements, the device was soaked in a 1 M Na$_2$SO$_4$ solution, during the measurement, to avoid evaporation of electrolyte solution. Measurements were conducted on a CH instrument excluding cycle stability which was conducted on Bio-Logic instrument.

Example 7

Electrochemical Properties of Symmetric Supercapacitors Composed of a Pair of Ni$_{(base)}$/Ru$^{(0)}$/RuO$_2$ Electrodes (of the Invention) or a Pair Au$_{(base)}$/Ru$^{(0)}$/RuO$_2$ Electrodes (Comparative)

The symmetric supercapacitors of Example 6 were tested using different electrochemical techniques.

Cyclic Voltammetry Measurements

FIGS. 9A to 9F show CV curves recorded for symmetric supercapacitors devices assembled as described in Example 6, i.e., using 2.5 k deposition cycles and post-deposition electrochemical oxidation to create Ru/RuO$_2$ coatings either on nickel (black curves) or gold (orange curves) current collectors. Cyclic voltammetry measurements were conducted with a two-electrode configuration at the voltage range of 0 to 1 volt at different scan rates (10 V/s, 50 V/s, 200 V/s, 500 V/s, 1000 V/s and 2000 V/s, which correspond to FIGS. 9A to 9F, respectively in 1M Na$_2$SO$_4$ electrolyte solution.

The data in FIG. 9 A to F attest to the excellent capacitive properties of the supercapacitor consisting of the Ru/RuO$_2$-coated Ni electrodes even at high scan rates, as well as the superior properties of the Ni-deposited electrodes compared to the gold-based SC. Specifically, rectangular shapes of the CV curves, indicating near-ideal capacitor behavior, were maintained even at scan rates approaching 1000 V s$^{-1}$ (FIGS. 9A-D). That is, the CV data in FIGS. 9 A-F reveal that supercapacitors constructed from Ru/RuO$_2$-coated Au electrodes exhibited significantly lower capacitive behavior in high scan rates compared to the Ni$_{(base)}$/Ru$^{(0)}$/RuO$_2$ devices.

To demonstrate the differences in the capacitive properties of the two supercapacitors, i.e., in their capacitance retention, capacitance versus scan rate plots were created. The capacitance from the cyclic voltammetry (CV) curves is calculated based on the following equation:

$$C = \frac{\int I \cdot dV}{2v \cdot A \cdot V}$$

where the I is the current and ∫IdV is the area of the CV curve, v is the scan rate, A is the area of the electrode and V is the voltage window. Capacitance versus scan rate plot is given in FIG. 10, for the symmetric supercapacitors that are based Ru/RuO$_2$-coated Ni electrodes and Ru/RuO$_2$-coated Au electrodes. It is seen that capacitance drop is faster for the gold-based device compared to the Ni-based device. Specifically, approximately 75% capacitance retention was recorded at a scan rate of 200 V s$^{-1}$ and excellent 35% retention was achieved at 2000 V s$^{-1}$ compared to the capacitance calculated at 10 V s$^{-1}$.

Figure 10:
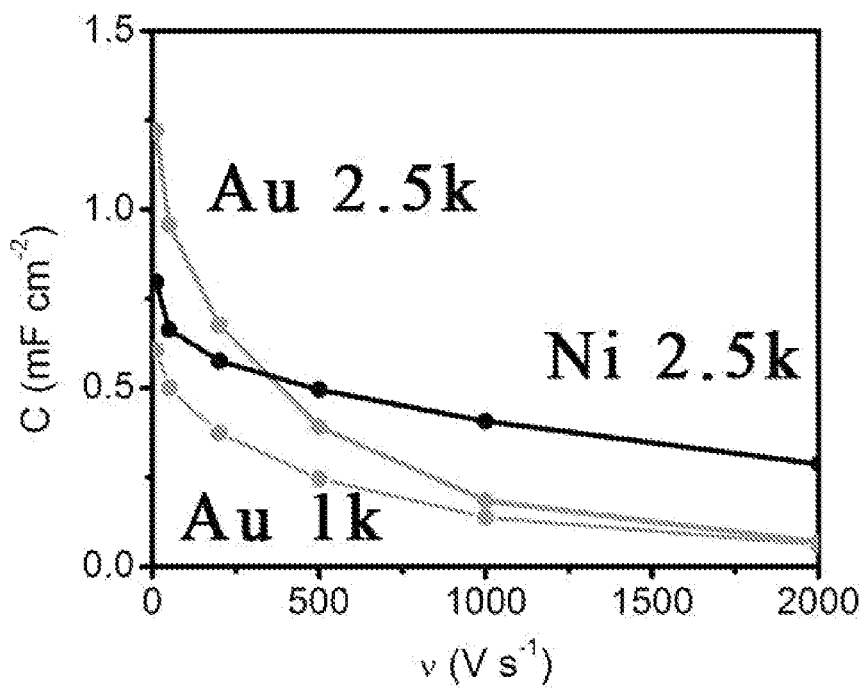
FIG. 10 is capacitance versus scan rate plot for the symmetric supercapacitors that are based on the Ru/RuO2-coated Ni electrodes and Ru/RuO2-coated Au electrodes.

To better appreciate the role of the current collector metal in achieving good performance of the supercapacitor of the invention, a different gold-based supercapacitor was fabricated according to the procedure of Example 6, by assembling gold electrodes produced by 1000 deposition cycles (and post-deposition electrochemical oxidation), namely, with lower loading of active material applied onto the gold current collector. Still, as shown in FIG. 10, even at lower (1000 instead of 2500) deposition cycles, the Ru/RuO$_2$-coated Au device shows faster capacitance decrease than the Ru/RuO$_2$-coated Ni device, highlighting the role of the nickel in the supercapacitors of the invention.

Figure 11:
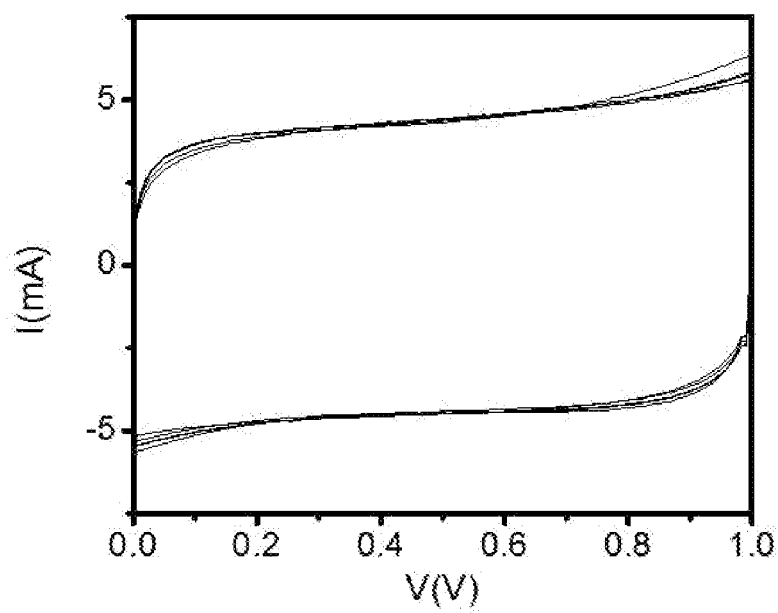
FIG. 11 is a CV of the Ru/RuO2 film at a scan rate of 1 V/s after 25k cycles.

To check the stability of the Ru/RuO$_2$ film, cyclic voltammetry measurements of 25 k cycles at a scan rate of 1 V/s was conducted and the voltammogram is presented in FIG. 11. From the graph it is seen that no change in capacitance was observed even after 25 k cycles showing the great potential of the device for prolonged operation.

Figure 12A:
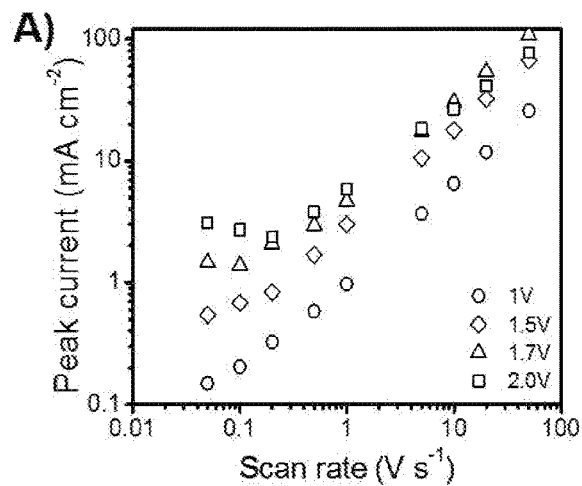
FIG. 12A is a plot of peak currents as a function of scan rate for the symmetric supercapacitors that are assembled using electrodes produced with 2.5k deposition cycles and post-deposition electrochemical oxidation to create Ru/RuO2 coating on nickel at 1.0 V, 1.5 V, 1.7 V and 2.0 V voltage windows.
Figure 12B:
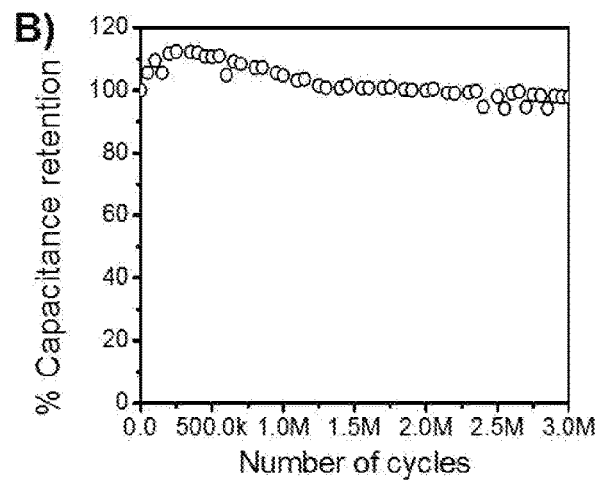
FIG. 12B is a plot of capacitance retention percentage as a function of the number of consecutive charge/discharge cycles at a 1.0 V voltage window for the symmetric supercapacitors.

Cyclic voltammetry of a symmetric supercapacitor (assembled using electrodes produced with 2.5 k deposition cycles and post-deposition electrochemical oxidation to create Ru/RuO$_2$ coating on nickel) was conducted to determine peak currents as a function of scan rates across different voltage windows. Results are shown in FIG. 12A (circles: 1.0 V, rhombuses: 1.5 V, triangles: 1.7 V and squares: 2.0 V). It is seen that voltage windows above the water decomposition voltage of 1.23V were investigated. FIG. 12A demonstrates that at scan rates above 1 V s$^{-1}$, the current increased linearly with the scan rate, indicating capacitive based current, while no faradaic currents (resulting from water decomposition) were detected even at a voltage window as high as 2 V (e.g. linear slopes). This is crucial to prevent gas formation and damage to the SC due to voltage spikes, which are common in AC signals.

Figure 13:
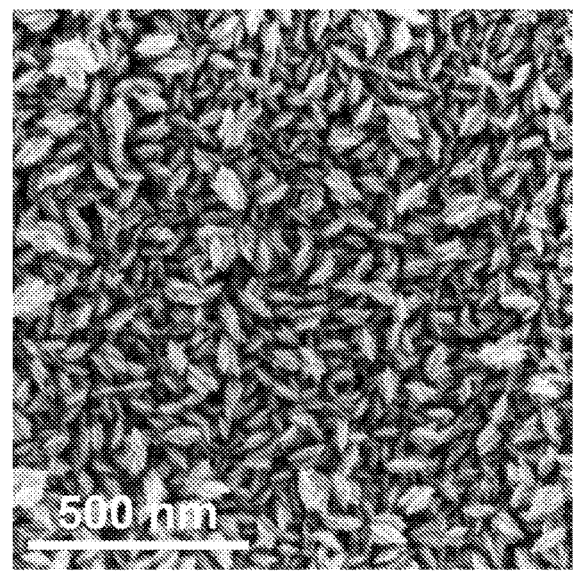
FIG. 13 is a SEM image of the surface of the Ru/RuO2-coated nickel electrode after 3 million charging cycles at a potential window of 1.5 V and a scan rate of 10 V/s.

Additionally, capacitance retention percentage is plotted against the number of consecutive charge/discharge cycles, spanning the range up to 3 million cycles. Excellent capacitance retention of the Ru/RuO$_2$-nickel coated SC is observed under the experimental conditions, i.e., across a voltage window of 1.5 V and a scan rate of 10 V s$^{-1}$. The increase in capacitance following initial cycling (above nominal 100%) likely reflects enhanced oxidation of the metallic Ru, combined with more effective utilization of the Ru/RuO$_2$ surface, overall contributing to more efficient occurrence of the redox processes at the electrode surface. Notably, even after 3 million cycles, capacitance retention of 98% was observed. This is in line with the SEM image shown in FIG. 13, showing the surface of the Ru/RuO$_2$-coated nickel electrode after 3 million charging cycles at a potential window of 1.5 V and a scan rate of V s$^{-1}$. No significant structural changes are noted in the coating.

Impedance Spectroscopy Measurements

Impedance spectroscopy analysis was conducted and results are presented in FIGS. 14-17.

Figure 14:
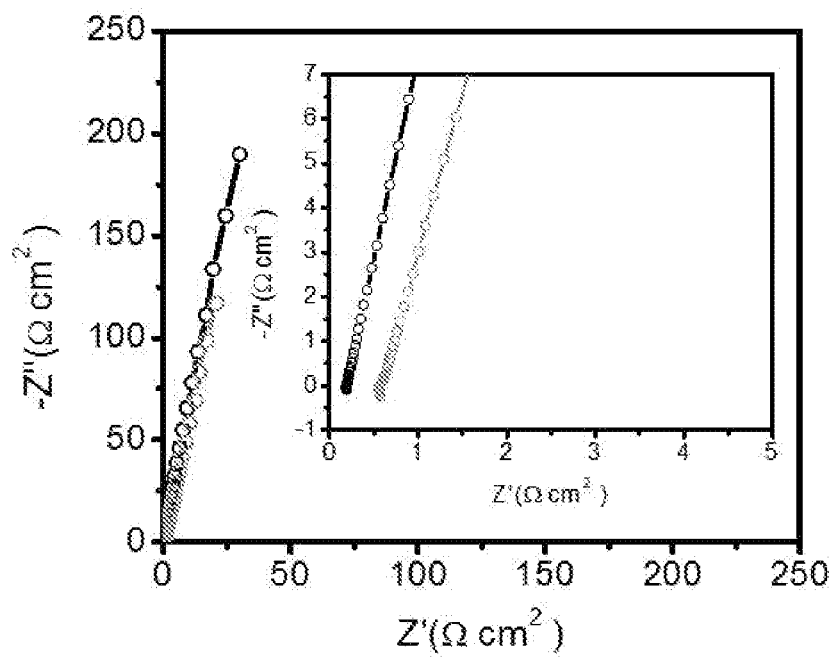
FIG. 14 is a Nyquist plot of Au(base)/Ru(0)/RuO2 and Ni(base)/Ru(0)/RuO2 devices.

Nyquist plot for both the Au$_{(base)}$/Ru$^{(O)}$/RuO$_2$ device and the Ni$_{(base)}$/Ru$^{(O)}$/RuO$_2$ device shows a nearly vertical line for each case, with a negligible charge transfer resistance (FIG. 14). The inset shows a magnification of the high frequency region. The lower resistance of the Ni$_{(base)}$/Ru$^{(O)}$/RuO$_2$ device, at high frequencies, can be attributed to the higher surface area of the electrode. From the graph, and assuming a model of a resistor and capacitor in series, we can calculate the RC time constant to be 643 is and 245 for the Au$_{(base)}$/Ru$^{(O)}$/RuO$_2$ and Ni$_{(base)}$/Ru$^{(O)}$/RuO$_2$ devices, respectively.

We can write the impedance of the system as follows:

$$Z = Z_R + Z_C = R + \frac{1}{i \cdot 2\pi f \cdot C} = R - \frac{i}{2\pi f \cdot C}$$

From the equation we can calculate the capacitance as a function of the frequency using the following equation:

$$C = \frac{-1}{2\pi \cdot f \cdot A \cdot Z''(f)}$$

where C is the areal capacitance, f is the frequency, A is the area of one electrode and Z" is the imaginary value of the impedance.

Figure 15:
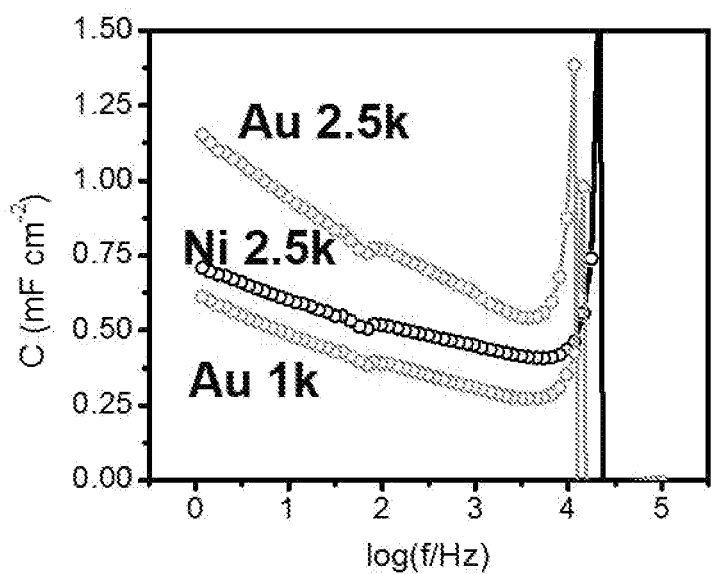
FIG. 15 is a plot of the calculated capacitance for 2.5k Ni, 1k Au and 2.5k Au electrodes for Au(base)/Ru(0)/RuO2 and Ni(base)/Ru(0)/RuO2 devices.
Figure 16:
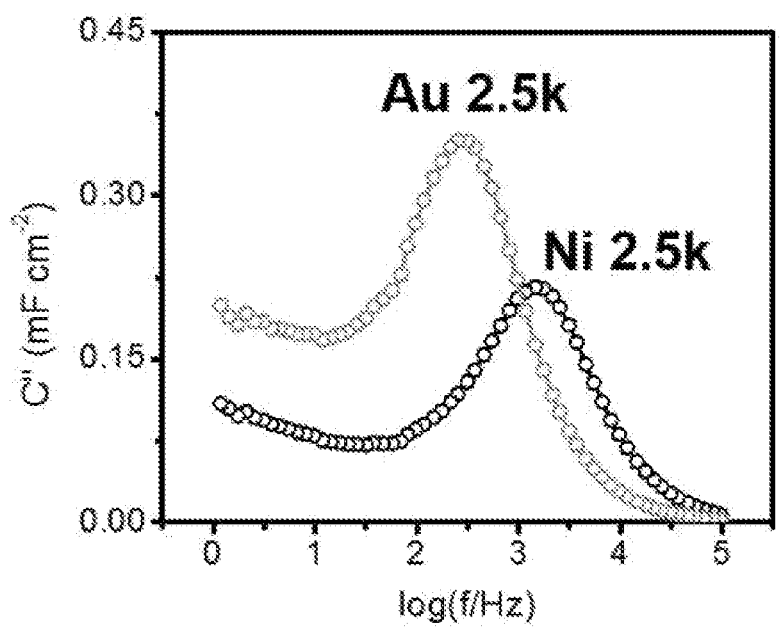
FIG. 16 is a plot of the imaginary areal capacitance for 2.5k Ni and 2.5k Au electrodes for Au(base)/Ru(0)/RuO2 and Ni(base)/Ru(0)/RuO2 devices.
Figure 17:
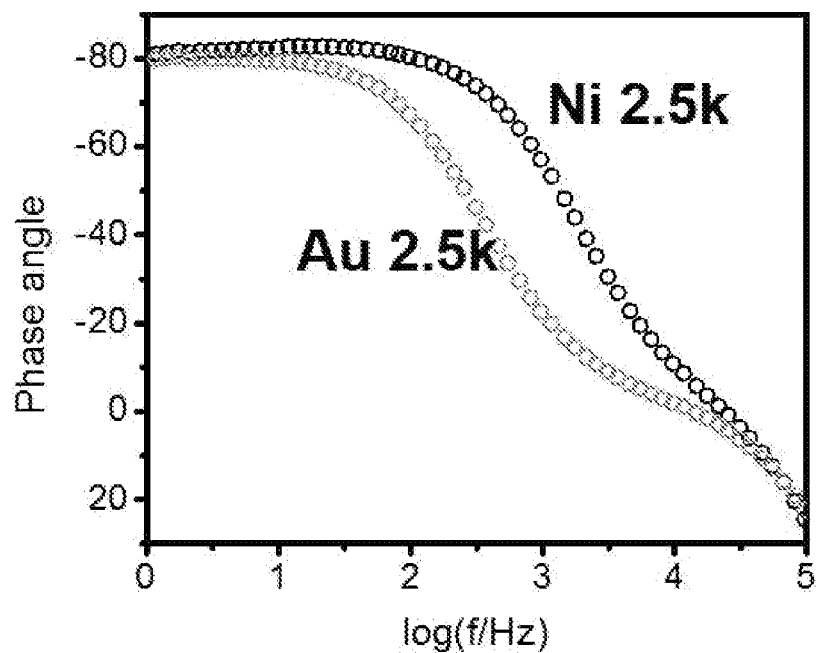
FIG. 17 is a Bode plot of the phase angle as a function of the frequency for 2.5k Ni and 2.5k Au electrodes for Au(base)/Ru(0)/RuO2 and Ni(base)/Ru(0)/RuO2 devices.

The calculated capacitance is presented in FIG. 15, showing that the decrease in performance is much more pronounced in the Au$_{(base)}$/Ru$^{(O)}$/RuO$_2$ device compared to the Ni$_{(base)}$/Ru$^{(O)}$/RuO$_2$ device.

The relaxation time, which is the minimum discharge time required for achieving more than 50% efficiency, was determined by calculating the imaginary part of the areal capacitance using the following equation:

$$C'' = \frac{-Z'(f)}{2\pi \cdot f \cdot A \cdot |Z(f)|^2}$$

where C" is the imaginary areal capacitance, Z' is the real part of the impedance, |Z| is the impedance vector magnitude. The results presented in FIG. 16, where the relaxation time is 1/f at the maximum point of the curve. The relaxation time of the Au/Ru/RuO$_2$ device is 3.9 ms, which is almost an order magnitude higher than the relaxation time of the Ni/Ru/RuO$_2$ device (0.68 ms).

Next, to assess the capacitance behavior of the device at high frequencies, the phase angle was calculated according to the following equation:

$$\text{Phase angle} = \arctan\left(\frac{Z''}{Z'}\right)$$

where a phase angle of −90° indicates a pure capacitor and a phase angle of 0° indicates a pure resistor. The two values that are important are the phase angle at the 120 Hz, which is the frequency at which a signal is coming out from a diode bridge in AC line rectifier, and the frequency at a phase angle of −45°, which is the frequency at which the device behaves equally as a capacitor and resistor. The phase angle as a function of the frequency is presented in FIG. 17, which is called Bode plot. From the Bode plot, one can see that the angle at 120 Hz for Au/Ru/RuO$_x$ and Ni/Ru/RuO$_x$ devices are −65° and −80° respectively. The frequencies, at a phase angle of −45°, for the Au/Ru/RuO$_2$ and Ni/Ru/RuO$_2$ devices are 328 Hz and 1678 Hz respectively. The results demonstrate the superior behavior of the Ni/Ru/RuO$_2$ device at high frequencies.

Galvanostatic Charge/Discharge Measurements

Figure 18A:
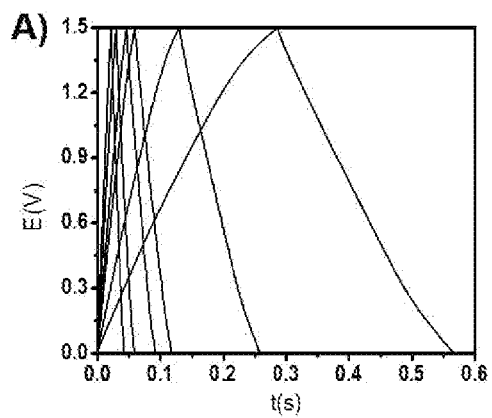
FIG. 18A is galvanostatic charge/discharge curves recorded at a voltage window of 1.5 V at current densities of 10, 20, 40, 50, 75, and 100 mA cm-2.
Figure 18B:
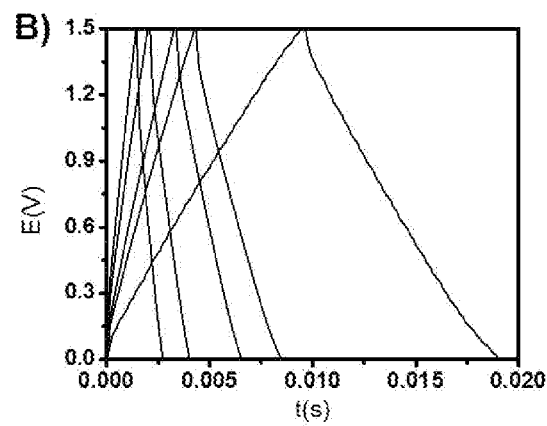
FIG. 18B is galvanostatic charge/discharge curves recorded at a voltage window of 1.5 V at current densities of 200, 400, 500, 750, and 1000 mA cm-2.

Galvanostatic charge/discharge curves were recorded at a voltage window of 1.5 V in a current density range of 10-1000 mA cm$^{-2}$ (0.59-59 kA cm$^{-3}$). The curves are shown in FIG. 18 A (at current densities of 10, 20, 40, 50, 75, and 100 mA cm$^{-2}$) and 18 B (at current densities of 200, 400, 500, 750, and 1000 mA cm$^{-2}$). The linear curves indicate good capacitor behavior even at high current densities.

The data obtained from the galvanostatic charge/discharge curves were used to evaluate the capacitance and energy density properties of the Ru/RuO$_2$-coated nickel supercapacitor prepared by 2.5 k CV cycles and the results are graphically presented in FIGS. 19 A and B.

Figure 19A:
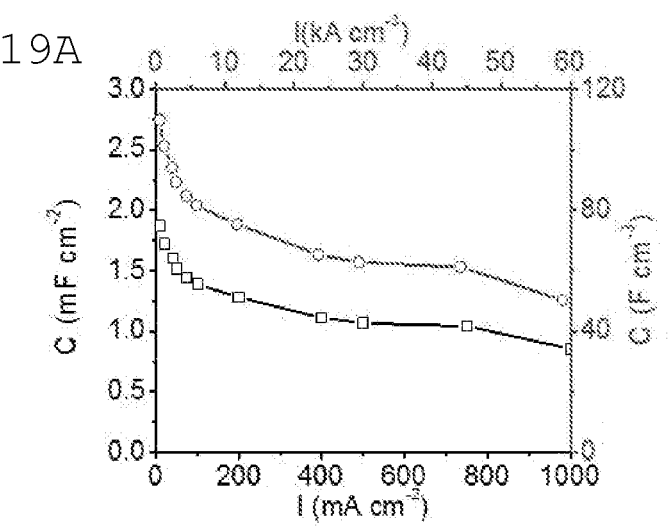
FIG. 19A is a plot of capacitance density as a function of the current density of the Ru/RuO2-coated nickel supercapacitor.

In FIG. 19A, areal (black; squares—see left ordinate) and volumetric (red; circles—see right ordinate) capacitance density as a function of current density are shown (volume was calculated from the thickness of the active layers of two electrodes). Specifically, a volumetric capacitance of 50 F $cm^{-3}$ was measured for a current density of 59 kA $cm^{-3}$ (red-circles curve, right ordinate). The high areal capacitance is 1.88 mF $cm^{-2}$ at a current density of 10 mA $cm^{-2}$ (black-squares curve, left ordinate). Notably, the device displays excellent capacitance retention with increasing current density, retaining 45% of the initial capacitance when the current density increased to 1000 mA $cm^{-2}$ (0.85 mF $cm^{-2}$).

Figure 19B:
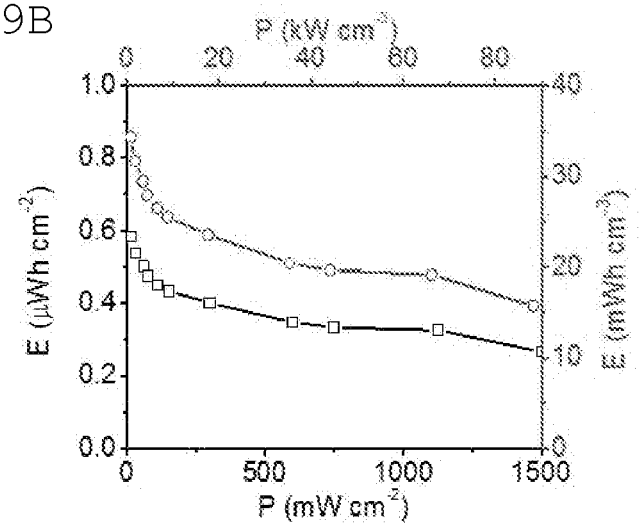
FIG. 19B is a plot of energy density as a function of the power density of the Ru/RuO2-coated nickel supercapacitor.

In FIG. 19B, areal (black; squares—see left ordinate) and volumetric (red; circles—see right ordinate) energy densities are plotted as a function of power density (volume was calculated from the thickness of the active layers of two electrodes). Due to the high current density reached (1000 mA $cm^{-2}$) high areal power density of 1500 mW $cm^{-2}$ can be obtained, retaining a high areal energy density of 0.27 µWh $cm^{-2}$.

Example 8

$Ni_{(base)}/Ni^{(O)}Ru^{(O)}/RuO_2$ Electrode Fabrication

Deposition of Ni, Ru and NiRu was carried out on a commercial Ni foil. A 1 M $Na_2SO_4$ deposition solution which contained $RuCl_3$ (0.01 M) and $NiSO_4*7H_2O$ (0.01 M) was used. The deposition was conducted using a 3-electrodes configuration with the Ni foil as the working electrode, Pt wire as the counter electrode and Ag|AgCl (3 M KCl) as the reference electrode. The deposition was accomplished using cyclic voltammetry (2.5 k cycles) between 0 V and −1.1V vs reference electrode at a scan rate of 10 V $s^{-1}$. Subsequent oxidation of the Ru to $RuO_2$ was carried out by running 5 k CV cycles at a scan rate of 10 V $s^{-1}$ in a voltage window of 0 and 0.8V using a 3-electrodes configuration with either Ni/Ru or Ni/NiRu as the working electrode, Pt wire as the counter electrode and Ag|AgCl (3 M KCl) as the reference electrode in 1M $Na_2SO_4$ solution. The deposition/oxidation was conducted on a SP-150 Bio-Logic (Claix, France).

Example 9

Characterization of $Ni_{(base)}/Ni^{(O)}Ru^{(O)}/RuO_2$ Electrode

Scanning electron microscopy (SEM) image showing the surface morphology of the $NiRu/RuO_2$ layer is presented in FIG. 20, indicating formation of dense $NiRu/RuO_2$ nanostructures. Cross-section scanning transmission electron microscopy (STEM) images depicted in FIGS. 21Bi&Ci (B and C are the first and second rows, respectively) show the structure of the electrodeposited layer before (FIG. 21Bi) and after (FIG. 21Ci) electrochemical oxidation of the Ru. The dendric like morphology of the $Ni^{(O)}Ru^{(O)}$ alloy clearly shows the effect of the Ni on the structure of the final electrodeposited layer compared to structure grown only from Ru precursor described herein in FIG. 8B. In addition, the STEM (FIGS. 21Bi&Ci) images show no change in the structure due to the electrochemical oxidation process. Electron dispersion spectroscopy (EDS) elemental map shows a uniform distribution of both Ni (FIGS. 21Bii&Cii) and Ru (FIGS. 21Biii&Ciii) across the deposited film.

Figure 22A:
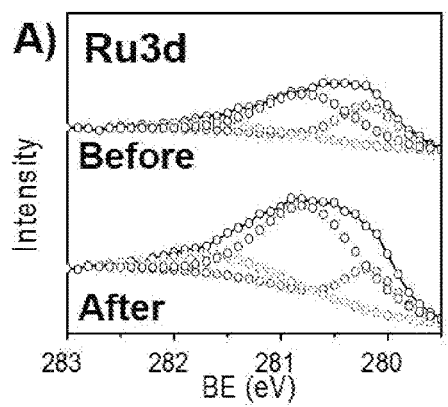
FIG. 22A is XPS spectra of the ruthenium 3d core level before and after electrochemical oxidation.
Figure 22C:
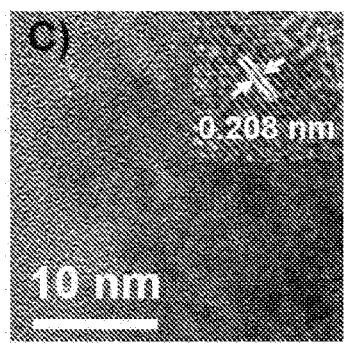
FIG. 22C is an HRTEM image of the as-deposited NiRu film (before electrochemical oxidation).
Figure 22D:
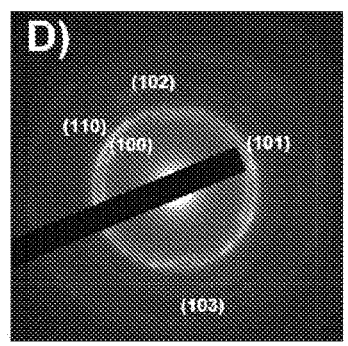
FIG. 22D is a diffraction pattern of the as-deposited NiRu film (before electrochemical oxidation).
Figure 22B:
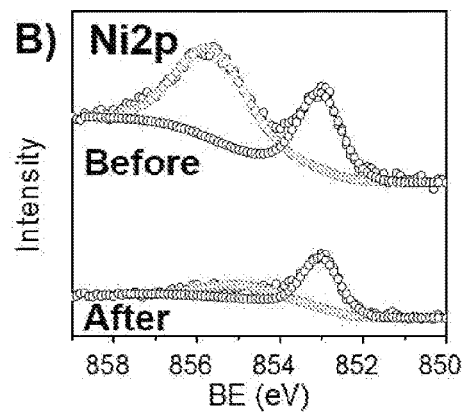
FIG. 22B is XPS spectra of the Ni 2p core level before and after electrochemical oxidation.

X-ray photoelectron spectroscopy (XPS) spectra are shown in FIG. 22A, of the ruthenium 3d core level before and after electrochemical oxidation and in FIG. 22B of the Ni 2p core level before and after electrochemical oxidation. XPS analysis of the Ru 3d core level peaks indicates that the as-deposited Ru on the surface has already been oxidized, with only 32.5% of the Ru on the surface being in the $Ru^{(O)}$ state (FIG. 22A, upper spectrum). After electrochemical oxidation (FIG. 22A, lower spectrum) the percentage of the $Ru^{(O)}$ on the surface is reduced to 17% and most of the $RuO_2$ on the surface is anhydrous (67%, peak at 280.73 eV).

X-ray diffraction (XRD) spectra is shown in FIG. 23. XRD spectra of as deposited $Ni_{(base)}/Ni^{(O)}Ru^{(O)}$ (black) and after electrochemical oxidation $Ni_{(base)}/Ni^{(O)}Ru^{(O)}/RuO_2$ (red) is presented on a logarithmic scale. (bold circles peaks correspond to hexagonal NiRu (Ru rich, PDF No. 01-072-2536), X peaks correspond to hexagonal Ru (PDF No. 00-006-0663), and bold triangles peaks correspond to cubic Ni arising from the Ni substrate (PDF No. 00-004-0850). XRD analysis lends support to the finding that the XPS signal at binding energy (BE) of 280.18 eV arises from the hexagonal NiRu phase, indicating that the NiRu phase is Ru rich. This is consistent with the higher reduction potential of Ru, compared to Ni, which supports electrochemical deposition of a Ru-rich NiRu phase. In addition, no hexagonal Ru phase was detected, supporting that the formation of $RuO_2$ due to electrochemical oxidation is through oxidation of the Ru from the hexagonal NiRu phase. XPS analysis of the Ni 2p core-level peaks, prior to the Ru electrochemical oxidation (FIG. 22B top spectrum), indicates a high-intensity satellite peak arising at 855.7 eV which was previously shown for the formation of NiO layer on top the NiRu alloy. After the electrochemical oxidation of the Ru the satellite peak indicating NiO is removed and two peaks at 855.1 eV and 853.0 eV indicating the exitance of $Ni^{(O)}$ in NiRu alloy appeared (FIG. 2B bottom spectrum).

Analysis of the $Ni^{(O)}Ru^{(O)}$ and $Ni^{(O)}Ru^{(O)}/RuO_2$ layers was conducted on a cross-section lamella prepared through a focus ion beam (FIB). High-resolution transmission electron microscopy (HRTEM) image of the as-deposited NiRu film revels that the film is composed of crystalline NiRu nanoparticles (FIG. 22C). The HRTEM image indicates that Ru is predominantly present in the NiRu phase whereas the exitance of $RuO_2$ is mainly in the surface (see also XPS results, FIG. 22A top spectrum). The inset in FIG. 22C shows a lattice spacing of 0.208 nm corresponding to (002) plane of hexagonal NiRu, which means that the phase is Ru rich. Diffraction pattern of the film, FIG. 22D, showing the (100), (101), (110), (102), and (103) crystal plane of hexagonal RuNi (PDF card No. 01-072-2536), lends further support to the observation that the film does not contain metallic Ni nor metallic Ru phases. EDS point analysis conducted across the film shows a roughly constant atomic ratio of 5:3:2 for Ni:Ru:O, respectively. The high content of Ni, in contradiction to the Ru rich NiRu phase, is due to the existence of the NiO indicated by the XPS results. After the electrochemical oxidation of Ru, NiO is removed (XPS, FIG. 22B bottom spectrum), and the content of Ni becomes lower than Ru, which is consistent with the presence of the hexagonal NiRu phase.

Figure 22E:
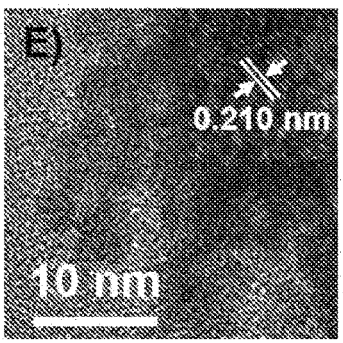
FIG. 22E is an HRTEM image of the NiRu/RuO2 layer (after electrochemical oxidation).
Figure 22F:
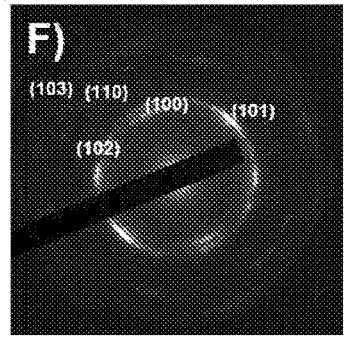
FIG. 22F is a diffraction pattern of the NiRuRuO2 layer (after electrochemical oxidation).

In addition, the analysis of the $NiRu/RuO_2$ layer (after electrochemical oxidation), presented in FIGS. 22E&F, reveals that the core is still composed mainly of hexagonal NiRu, where the addition of amorphous $RuO_2$ is limited to the surface. Interestingly, while both XRD and HRTEM diffraction results show hexagonal NiRu phase, a close inspection of the NiRu particles also reveals the existence of a small amount cubic NiRu, which indicates a Ni-rich NiRu phase.

Example 10

Assembly of Symmetric Supercapacitor Composed of a Pair of $Ni_{(base)}/Ni^{(O)}Ru^{(O)}/RuO_2$ Electrodes A symmetric supercapacitor was fabricated, based on a pair of $Ni_{(base)}/Ni^{(O)}Ru^{(O)}/RuO_2$ electrodes of Example 8. Coated electrodes produced following 2500 deposition cycles from 0.01M $RuCl_3$+0.01 M $NiSO_4$+1M $Na_2SO_4$ deposition solution were used for creation of the symmetric supercapacitor.

Step 1: Spacer Fabrication

Polystyrene (PS) fibers were electrospun from a polystyrene solution in dimethylformamide (30% w/v), on 2.5 cm 7.5 cm glass for 40 min (under a 20 kV voltage with a 22 cm between needle and collector) and were annealed at 100° C. for 15 min. Following the annealing, carboxylation of the PS microfibers was carried out by exposing the PS fibers to air plasma for 2 min under vacuum at 85 W. Finally, the film was kept in a solution of 1M $Na_2SO_4$ prior to use.

Step 2: Device Assembly

Symmetric supercapacitor was assembled from of a pair of $Ni_{(base)}/Ni^{(O)}Ru^{(O)}/RuO_2$ electrodes (with area between 0.1 and 0.3 cm$^2$) and the PS spacer soaked in 1 M $Na_2SO_4$ solution. The device was then wrapped using scotch tape.

Example 11

Electrochemical Properties of Symmetric Supercapacitor Composed of a Pair of $Ni_{(base)}/Ni^{(O)}Ru^{(O)}/RuO_2$ Electrodes The symmetric supercapacitor of Example 10 was tested using different electrochemical techniques.

Cyclic Voltammetry Measurements

FIGS. 24A to 24E show CV curves recorded for symmetric supercapacitors device assembled as described in Example 10. Cyclic voltammetry measurements were conducted with a two-electrode configuration (one electrode is connected to the working electrode terminal and the other to both the counter and reference electrode terminals) at the voltage range of 0 to 1 volt at different scan rates (10 V/s, 200 V/s, 500 V/s, 1000 V/s and 2000 V/s, which correspond to FIGS. 24A to 24E, respectively) in 1M $Na_2SO_4$ electrolyte solution. The instrument used was CH instrument.

It is seen that the rectangular shape is retained for high scan rates such as 10, 200, and 500 V s$^{-1}$ (FIG. 24A-C). A semi-rectangular shape still exists at 1000 V s$^{-1}$. Notably, 2200 mA cm$^{-2}$ areal current density is achieved at 2000 V s$^{-1}$ (FIG. 24E). FIG. 24F presents the discharge peak current density as a function of the scan rate, showing a linear behavior up to 1000 V s$^{-1}$.

The capacitance, calculated from the CV curves, is plotted against scan rate in FIG. 25. A high capacitance of 1.93 mF cm$^{-2}$ at 10 V s$^{-1}$ is noted, a 0.79 mF cm$^{-2}$ at 1000 V s$^{-1}$ (41% retention), and 0.46 mF cm$^{-2}$ at 2000 V s$^{-1}$ (24% retention).

Impedance Spectroscopy Measurements

The performance of the symmetric supercapacitor of Example 10 was assessed through electrochemical impedance spectroscopy measurements.

A Nyquist plot in a frequency range of 100 kHz-1 Hz is shown in FIG. 26A. In view of the nearly perpendicular line and in the absence of any visible semicircular Nyquist plot, one can model the device as a capacitor and a resistor connected in series. In addition, the nearly perpendicular line indicates a negligible current leakage from the device, demonstrating ideal capacitor behavior. The resistance at the frequency of 120 Hz extracted from the Nyquist plot is 0.260 $\Omega cm^2$.

The capacitor behavior of the devices was assessed by calculating the phase angle as a function of the frequency (FIG. 26B, black circles forming the upper curve). A phase angle of −90° indicates a perfect capacitor, while a phase angle of 0 indicate a perfect resistor. Because the phase angle decreases with increasing capacitance, the −76° calculated phase angle according to FIG. 26B is considered a reasonably high value. A phase angle of −45°, which indicates an equal capacitor and resistor behavior, was measured at a frequency of 966 Hz. The minimum point, in the graph of the overall impedance as a function of the frequency (FIG. 26B, blue circles forming the lower curve), indicates the equivalent series resistance (ESR) of the device and has a value of 0.122 $\Omega cm^2$. This low value is important in order to reach high power densities.

The capacitance which was calculated from the imaginary part of the impedance is plotted against the frequency in FIG. 26C. A high capacitance (1.31 mF cm$^{-2}$) is calculated at 120 Hz. From the capacitance and the resistance, a RC time constant ($\tau_{RC}$) of 0.31 ms is calculated. This results shows that the NiRu structure has high efficient electron conduction and high surface area which results in low resistance and high capacitance arising from the thin layer of $RuO_2$ on the surface of the NiRu.

Galvanostatic Charge/Discharge Measurements

Figure 27A:
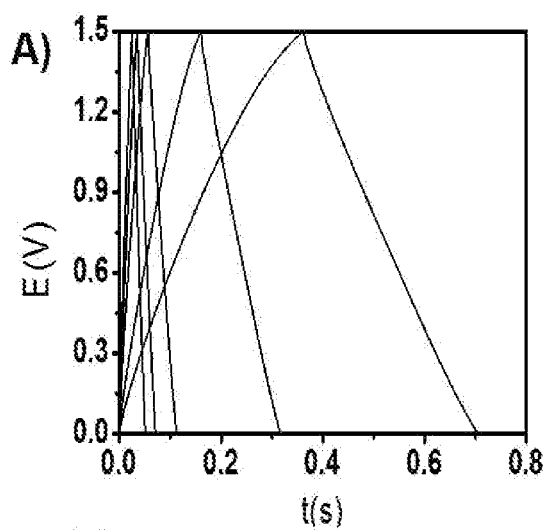
FIGS. 27A and 27B show galvanostatic charge/discharge curves recorded at a voltage window of 1.5 V across a current density range of 10-2000 mA cm-2.
Figure 27B:
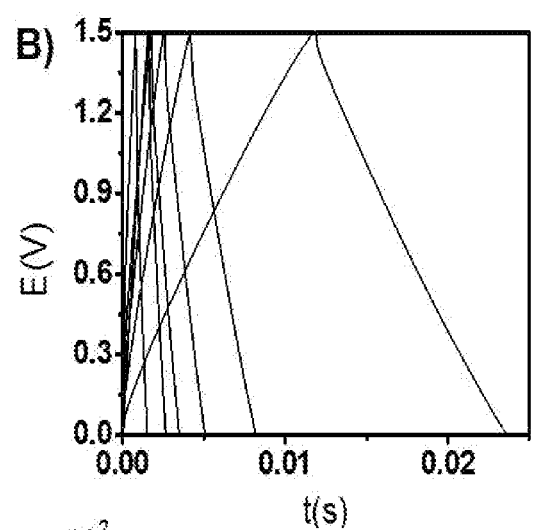

Galvanostatic charge/discharge curves were recorded at a voltage window of 1.5 V across a current density range of 10-2000 mA cm$^{-2}$. The curves are shown in FIG. 27A (at current densities of 10, 20, 50, 75, and 100 mA cm$^{-2}$) and 27B (at current densities of 200, 500, 750, 1000 and 2000 mA cm$^{-2}$). The linear curves indicate good capacitor behavior even at high current densities.

Figure 27C:
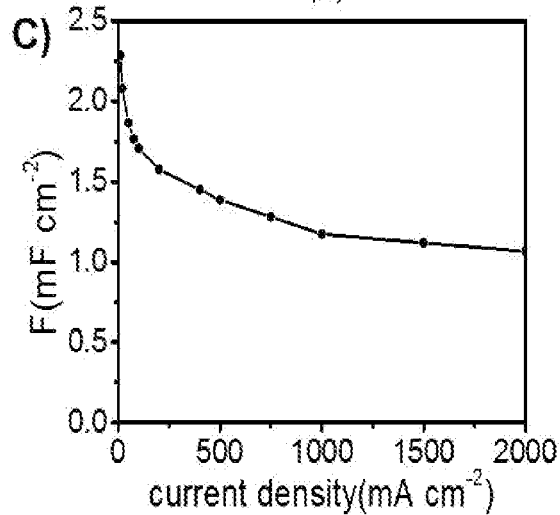
FIG. 27C is a plot of the areal capacitance density as a function of current density for the symmetric supercapacitor device.
Figure 27D:
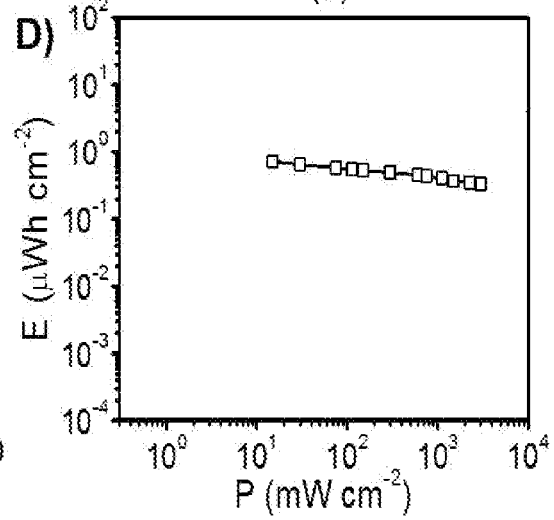
FIG. 27D is a plot of the areal energy density as a function of power density for the symmetric supercapacitor device.

The data obtained from the galvanostatic charge/discharge curves were used to evaluate the capacitance and energy density properties of the $Ni_{(base)}/Ni^{(O)}Ru^{(O)}/RuO_2$ supercapacitor of Example 10 and the results are graphically presented in FIGS. 27C and 27D.

In FIG. 27C, areal capacitance density as a function of current density is shown. Specifically, high areal capacitance of 2.29 mF cm$^{-2}$ at a current density of 10 mA cm$^{-2}$ is noted. Notably, the device displays excellent capacitance retention with increasing current density, retaining 47% of the initial capacitance when the current density increased to 2000 mA cm$^{-2}$ (1.07 mF cm$^{-2}$).

In FIG. 27D, areal energy density is plotted as a function of power density.

The invention claimed is:

1. A process for preparing an electrode, comprising:
  electrodeposition of metallic ruthenium/ruthenium oxide ($Ru^{(O)}/RuO_2$) coating onto a progressively etched nickel surface; and partial electrochemical oxidation of said metallic ruthenium to ruthenium oxide,
  wherein the electrodeposition and subsequent partial electrochemical oxidation are achieved with the aid of cyclic voltammetry, and
  wherein the electrodeposition is achieved with the aid of cyclic voltammetry of a nickel working electrode in $Ru^{3+}$-containing deposition solution in the presence of added sulfate salt, between switching potentials in the range from 0 to −1.1 V versus reference electrode.

2. A process according to claim 1, comprising the steps of:
  providing a two-electrodes or three-electrodes arrangement suitable for cyclic voltammetry, wherein the working electrode is a nickel-containing substrate immersed in an aqueous solution of ruthenium salt in the presence of the sulfate salt additive;

applying a potential across the working electrode and a reference electrode and sweeping the potential negatively between a first value and a second value versus the reference electrode, reversing the scan to the positive direction, and repeating the potential scan for many cycles, wherein the scan rate is not less than 1 V/s to deposit $Ru^{(O)}/RuO_2$-containing layer;

electrochemically oxidizing $Ru^{(o)}$ to ruthenium oxide, thereby creating a nickel electrode with $Ru^{(O)}/RuO_2$ coating thereon.

3. A process according to claim 2, wherein the sulfate salt additive is an alkali sulfate salt.

4. A process according to claim 2, comprising scanning the potential range between 0 V and −1.1V versus reference electrode, wherein the scan rate and number of cycles are adjusted to etch the surface of the nickel base.

5. A process according to claim 4, wherein the scan rate is of not less than 5 V/s and the number of cycles is at least 1000.

6. A process according to claim 1, wherein the deposition solution further comprises $Ni^{2+}$ source, such that $Ni^{(O)}$ is co-deposited alongside $Ru^{(o)}$, forming $Ni^{(o)}Ru^{(o)}$ alloy phase.

7. A process according to claim 6, wherein the deposition solution comprises $Ru^{3+}$ and $Ni^{2+}$ at molar ratio in the range from 3:5 to 5:3.

8. An electrode comprising:
a nickel-containing base; and
a coating comprising metallic ruthenium/ruthenium oxide $(RU^{(O)}/RuO_2)$ applied onto the nickel-containing base, wherein the nickel-containing base consists of 5 to 100 μm thick nickel foil and the $Ru^{(O)}/RuO_2$-containing coating is up to 500 nm thick.

9. An electrode according to claim 8, wherein the coating is an electrodeposited coating which underwent post electrodeposition electrochemical oxidation.

10. An electrode according to claim 9, wherein the coating is prepared by electrodeposition step of a mixed $Ru^{(o)}/RuO_2$ layer onto the nickel base through cyclic voltammetry in an aqueous solution of ruthenium salt in the presence of a salt additive; and a post-deposition step which consists of electrochemical oxidation of said a mixed $Ru^{(O)}/RuO_2$ layer whereby the oxide content is increased.

11. An electrode according to claim 8, wherein the coating further comprises electrodeposited $Ni^{(o)}$, forming $Ni^{(o)}Ru^{(o)}$ alloy phase with $RuO_2$ surface layer thereon.

12. A pseudo-capacitor comprising a pair of spaced apart electrodes, a separator disposed in the space between said electrodes and an electrolyte, wherein at least one of said electrodes is as defined in claim 8.

13. A pseudo-capacitor according to claim 12, which is a symmetric pseudo-capacitor.

14. A pseudo-capacitor capacitor according to claim 12, wherein the electrolyte is an alkali sulfate solution.

15. A pseudo-capacitor capacitor according to claim 12, wherein the separator consists of a film of polymeric microfibers.

16. A pseudo-capacitor according to claim 14, wherein the separator consists of carboxylated electrospun polystyrene microfibers.

17. An electrode comprising:
a nickel-containing base; and
a coating comprising metallic ruthenium/ruthenium oxide $(RU^{(O)}/RuO_2)$ applied onto the nickel-containing base, wherein an $Ru^{(o)}$ layer is interposed between the nickel-containing base and an outermost $RuO_2$-containing layer, such that the ruthenium oxide is preferentially located atop of said $Ru^{(o)}$ layer.

18. An electrode comprising:
a nickel-containing base; and
a coating comprising metallic ruthenium/ruthenium oxide $(RU^{(O)}/RuO_2)$ applied onto the nickel-containing base, wherein the proportion between $Ru^0$ and $RuO_2$ on the surface of the coating, as determined by the intensity of peaks assigned to $Ru^0$ and $RuO_2$ in a deconvoluted X-ray photoelectron emission spectrum (XPS), varies from 7:1 to 1:7.

19. An electrode according to claim 18, wherein $Ru^0/RuO_2$ are proportioned in the range from 3:1 to 1:3.

20. An electrode comprising:
a nickel-containing base; and
a coating comprising metallic ruthenium/ruthenium oxide $(RU^{(O)}/RuO_2)$ applied onto the nickel-containing base, wherein the coating comprises $Ni^{(o)}Ru^{(o)}$ alloy phase applied onto the nickel-containing base, with $RuO_2$ surface layer on said alloy.

21. An electrode according to claim 20, wherein the $Ni^{(o)}Ru^{(o)}$ alloy phase is ruthenium-rich.

* * * * *